(12) United States Patent
Mikonis et al.

(10) Patent No.: US 11,863,621 B2
(45) Date of Patent: *Jan. 2, 2024

(54) HYBRID DATA-ROUTING METHOD IN A PEER-TO-PEER COMPUTER NETWORK

(71) Applicant: Syntropy Network Limited, Palo Alto, CA (US)

(72) Inventors: Andrejus Mikonis, Vilnius (LT); Vytautas Jurenas, Vilnius (LT); Jonas Simanavicius, Vilnius (LT)

(73) Assignee: Syntropy Network Limited, Palo Alto, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/815,283

(22) Filed: Jul. 27, 2022

(65) Prior Publication Data

US 2023/0121240 A1 Apr. 20, 2023

Related U.S. Application Data

(63) Continuation-in-part of application No. 17/809,611, filed on Jun. 29, 2022, which is a continuation-in-part
(Continued)

(51) Int. Cl.
*H04L 67/1087* (2022.01)
*H04L 45/121* (2022.01)
*H04L 47/283* (2022.01)

(52) U.S. Cl.
CPC ........ *H04L 67/1093* (2013.01); *H04L 45/121* (2013.01); *H04L 47/283* (2013.01)

(58) Field of Classification Search
CPC ....... H04L 45/70; H04L 43/00; H04L 9/3247; H04L 43/0852; H04L 43/0858;
(Continued)

(56) References Cited

U.S. PATENT DOCUMENTS 8,570,861 B1 * 10/2013 Brandwine ............ H04L 45/70
370/230
2010/0061385 A1 * 3/2010 Welin .................. H04L 67/1065
380/277
(Continued)

*Primary Examiner* — Ian N Moore
*Assistant Examiner* — Brian T Le
(74) *Attorney, Agent, or Firm* — SV Patent Service

(57) ABSTRACT

A method for autonomously routing data using in a peer-to-peer computer network, includes automatically updating a peer-to-peer computer network comprising a plurality of nodes and automatically relaying data from the first node to a second node by one of the neighbor nodes associated with the first node. The method further includes automatically sending pulse messages from a first node to neighbor nodes and candidate nodes, dynamically adjusting time intervals between the pulse messages, receiving return pulses by the first node from some of the neighbor nodes and the candidate nodes, calculating round-trip times (RTTs) between the first node and the neighbor nodes or the candidate nodes, sorting the nodes in the neighbor nodes and the candidate nodes into a plurality of orbital bins, and automatically selecting and assigning a node from the orbital bins to update neighbor nodes associated with the first node.

21 Claims, 9 Drawing Sheets

Related U.S. Application Data of application No. 17/665,550, filed on Feb. 6, 2022, now Pat. No. 11,743,179, which is a continuation-in-part of application No. 17/502,382, filed on Oct. 15, 2021, now Pat. No. 11,689,456.

(58) Field of Classification Search
CPC .............. H04L 43/0864; H04L 43/087; H04L 43/0829; H04L 45/7453; H04L 67/104; H04L 67/1042; H04L 67/1001; H04L 67/04; H04L 67/1093; H04L 9/50; H04L 47/125; H04L 47/283; H04L 40/24; H04L 45/48; H04L 45/04; H04L 45/24; H04L 45/20; H04L 45/122; H04L 45/02; H04L 45/44; H04L 45/121; H04L 41/12; H04W 4/00; H04W 84/10; H04W 84/18; H04W 40/24; H04W 40/32
See application file for complete search history.

(56) References Cited

U.S. PATENT DOCUMENTS

| | | | | |
|---|---|---|---|---|
| 2022/0141738 A1* | 5/2022 | Chou | ................. | H04L 41/5051 455/437 |
| 2022/0278922 A1* | 9/2022 | Kolar | ................. | H04L 43/0894 |

* cited by examiner

HYBRID DATA-ROUTING METHOD IN A PEER-TO-PEER COMPUTER NETWORK

CROSS-REFERENCE TO RELATED APPLICATIONS

The present application is related to commonly assigned pending U.S. patent application Ser. No. 17/237,026, titled "Autonomously routing data using relay nodes pre-selected from a group of distributed computer nodes based on measured one-way latencies", filed Apr. 21, 2021, and commonly assigned U.S. patent application Ser. No. 17/665,550, titled "Autonomous data routing in a peer-to-peer computer network", filed Feb. 6, 2022, issued as U.S. Pat. No. 11,743,179 dated Aug. 29, 2023, the content of which is incorporated herein by reference.

FIELD OF THE INVENTION

The present invention relates generally to the field of computer network, and in particular, to improving performance of data communications over computer networks such as the Internet.

BACKGROUND OF THE INVENTION

The current Internet transit services are vulnerable to eavesdropping, and fail to route around partially degraded networks, leading to suboptimal network performance.

Conventional technologies in the dynamically routed internet field primarily operate at the Network Layer (Layer 3) by selecting a best path for traffic based on the shortest path between the data sending node and the destination node, which often does not minimize data-transmission latencies. The conventional technologies also do not take into account of network degradation. Related technologies in the Virtual Private Networking (VPN) provide protection from eavesdropping, but do not route around degraded network paths.

The current Internet system is inefficient and unreliable because of several key factors: first, economic incentives are misaligned. Internet service today provides global connectivity but is unable to guarantee the network performance of the connectivity provided. Internet Service Providers generally seek to minimize costs and maximize profits. Content providers seek to deliver the best end-user experience to maximize revenues and customer retention while minimizing costs, especially for IP transit while end-users want the best quality of service from both Internet Service Providers and content providers for free. Secondly, there is lack of outbound routing control. Content providers cannot control how their outbound traffic is routed. As a result, routers typically forward traffic along congested and suboptimal network paths to the destination, even when better alternative network paths exist. Thirdly, reliance on third-party security. The Internet's position as a zero-trust network fails to meet the challenges associated with online data sensitivity, increased cybercrime risk, and user inexperience. The vast majority of security solutions is guaranteed by a third party, such as a certificate authority or cloud provider. Consequently, traditional Internet bears the risk of that third party being compromised.

There is therefore a need for computer network technologies with improved transmission speed, improved security, and higher reliability in data delivery.

SUMMARY OF THE INVENTION

In one general aspect, the present invention relates to a method for autonomously routing data using in a peer-to-peer computer network, the method including automatically updating a peer-to-peer computer network comprising a plurality of nodes, which includes: automatically sending pulse messages from a first node to neighbor nodes and candidate nodes associated with the first node, dynamically adjusting time intervals between the pulse messages, in response to the pulse messages, receiving return pulses by the first node from at least some of the neighbor nodes and the candidate nodes, calculating round-trip times (RTTs) between the first node and the neighbor nodes or the candidate nodes based on the pulse messages and the return pulses, sorting the nodes in the neighbor nodes and the candidate nodes into a plurality of orbital bins each characterized by a specific interval of RTTs associated with the first node, and based on the RTTs, automatically selecting and assigning a node from one of the orbital bins to update neighbor nodes associated with the first node, and automatically relaying data from the first node to a second node by one of the neighbor nodes associated with the first node.

Implementations of the method may include one or more of the following. The time intervals between the pulse messages can be dynamically adjusted based on time of a day, time of a week, or schedules of events. The time intervals between the pulse messages can be dynamically adjusted based on a network location or network performance. The time intervals between the pulse messages can be dynamically adjusted based on roles of the neighbor nodes or the candidate nodes receiving the pulse messages from the first node. The roles can include neighbor nodes, candidate nodes, or relay nodes that have relayed data in the peer-to-peer computer network. An RTT between the first node and a node in the neighbor nodes or the candidate nodes can be calculated by a sending time stamp of a pulse message sent from the first node and a reception time stamp of a return pulse received by the first node in response to the pulse message, the sending time stamp and the reception time stamp being both recorded at the first node. At least some of computer clocks at the plurality of nodes can have skews or clock rate discrepancies relative to each other, wherein step of calculating RTTs is independent of the skews or the clock rate discrepancies between the computer clocks at the plurality of nodes in the peer-to-peer computer network. The neighbor nodes and the candidate nodes can be sorted substantially evenly into a plurality of orbital bins based on the RTTs of the associated return messages received by the first node. The step of automatically relaying data from the first node to a second node by one of the neighbor nodes associated with the first node further can include sending one or more path packages from the first node directly to the second node to measure a one-way latency (OWL) and jitter in a direct path between the first node and the second node, sending one or more path packages from the first node to the second node via one or more relay nodes, each path package recording a reception time stamp and a sending time stamps at the relay nodes along associated relayed data path, automatically selecting one of the relayed data paths if a total OWL and an average jitter associated with the one of the relayed data paths satisfy predetermine criteria in comparison to the direct path, and sending data from the first node to the second node along the selected one of the relayed data paths. The method can further include cryptographically signing a path packet by a relay node in a relayed data path using a private key paired with a public key of the relay node. The method can further include cryptographically signing an updated version of a path packet by a relay node in a relayed data path, wherein the updated version of the path packet includes node IDs of a previous node and a next node along the relayed path and a measured OWL of a last routing segment along the relayed path. The method can further include storing, at each of the updated nodes, a peer-node hash table that includes hash values of the node IDs of some of the updated nodes, and querying a node ID of the second node using peer-node hash tables stored at the first node and other updated nodes. The total OWL associated with each of the one or more relayed data paths between the first node and the second node is obtained by summing OWLs measured at all routing segments along the each of the one or more relayed data paths. the total OWL associated with a selected one of the relayed data paths is smaller than the OWL measured in direct path from the first node to the second node. The average jitter associated with each of the one or more relayed data paths between the first node and the second node is obtained by calculating a mean of jitters measured at all routing segments along the each of the one or more relayed data paths.

In another general aspect, the present invention relates to a non-transitory computer-readable medium storing a plurality of instructions which, when executed by one or more processors, cause the one or more processors to perform operations a computer network, wherein the operations include: automatically sending pulse messages from a first node to neighbor nodes and candidate nodes associated with the first node, dynamically adjusting time intervals between the pulse messages, in response to the pulse messages, receiving return pulses by the first node from at least some of the neighbor nodes and the candidate nodes, calculating RTTs between the first node and the neighbor nodes or the candidate nodes based on the pulse messages and the return pulses, sorting the nodes in the neighbor nodes and the candidate nodes into a plurality of orbital bins each characterized by a specific interval of RTTs associated with the first node, and based on the RTTs, automatically selecting and assigning a node from one of the orbital bins to update neighbor nodes associated with the first node, and automatically relaying data from the first node to a second node by one of the neighbor nodes associated with the first node.

In another general aspect, the present invention relates to a computer system for autonomously routing data using in a peer-to-peer computer network. The computer system includes a communication module configured to send or receive data to and from nodes in a peer-to-peer computer network, and a computer memory storing the instructions that, when executed by the one or more processors at the plurality of nodes, cause the plurality of nodes to automatically update a peer-to-peer computer network comprising a plurality of nodes, comprising: automatically send pulse messages from a first node to neighbor nodes and candidate nodes associated with the first node, dynamically adjust time intervals between the pulse messages, in response to the pulse messages, receiving return pulses by the first node from at least some of the neighbor nodes and the candidate nodes, calculate round-trip times (RTTs) between the first node and the neighbor nodes or the candidate nodes based on the pulse messages and the return pulses, sort the nodes in the neighbor nodes and the candidate nodes into a plurality of orbital bins each characterized by a specific interval of RTTs associated with the first node, and based on the RTTs, automatically select and assigning a node from one of the orbital bins to update neighbor nodes associated with the first node, and automatically relaying data from the first node to a second node by one of the neighbor nodes associated with the first node.

In another general aspect, the present invention relates to a method for autonomously routing data using in a peer-to-peer computer network, the method including identifying multiple paths from a source node to a destination node, wherein each of the multiple paths can include two or more routing segments that each includes a sending node and a receiving node in a peer-to-peer computer network, wherein the step of identifying multiple paths includes selecting the receiving node among a plurality of nodes in the peer-to-peer computer network based on round-trip times (RTTs) measured between the sending node and the plurality of nodes, sending path packages along the multiple paths from the source node to the destination node, measuring total one-way latencies (OWLs) associated with the multiple paths using path packages from the source node to the destination node, selecting a relayed data path from the multiple paths at least in part based on the total OWLs respectively associated with the multiple paths from the source node to the destination node, and routing data, from the source node to the destination node, along the relayed data path selected.

In another general aspect, the present invention relates to a method for autonomously routing data using in a peer-to-peer computer network. The method includes automatically identifying a destination node to receive a data transfer in a peer-to-peer computer network, wherein the peer-to-peer computer network comprises a plurality of nodes each associated with a unique node ID, defining one or more constraints for the data transfer, storing, at a source node, IDs of first neighbor nodes that are connected to the source node in the peer-to-peer computer network, wherein the neighbor nodes are sorted into a plurality of first orbital bins according to round-trip times between the source node and the first neighbor nodes, sending one or more path packages from the source node to the destination node in a first direct data path from the source node to the destination node, sending path packages from the source node to the first neighbor nodes, wherein the first neighbor nodes include a first hop node, updating a path packet received by the first hop node with associated hop information, sending one or more path packages comprising updated hop information to the destination node in a second direct data path from the first hop node to the destination node, storing IDs of second neighbor nodes that are connected to the first hop node, wherein the second neighbor nodes are sorted into a plurality of second orbital bins according to RTTs between the first hop node and the second neighbor nodes, if the constraints for the data transfer allows more than one relay node in a data routing path, sending path packages comprising updated hop information from the first hop node to the second neighbor nodes, wherein the second neighbor nodes include a second hop node, repeating, at the second hop node, steps of updating a path packet with associated hop information and sending one or more path packages to the destination node, receiving, by the destination node, path packages from the source node, the first hop node, and additional hop nodes allowed by the constraints for the data transfer, calculating total OWLs and performance metrics respectively for the path packages received by the destination node, and automatically selecting a relayed data path for the data transfer from the source node to the destination node if the associated total OWL and performance metrics satisfy predetermine criteria.

The above disclosed system and method provide a novel hybrid approach: nodes in a peer-to-peer network are qualified and maintained largely based on round-trip pulse measurements between peer nodes, while data routing paths are measured and selected based on one-way latency measurements. In other words, round-trip pulse measurements are used in peer node selection and one-way latency measurements are used in routing path selection.

One striking advantage is the vast scalability of the data routing method. Each node in the peer-to-peer network only needs to maintain a small number of neighbor nodes, which drastically reduces the burden of maintaining the peer network. Since all peer nodes in the network are connected in a cascading fashion, a node in the peer network can reach any other node in the same network. Thus, the decentralized data routing approach can perform data routing in a peer-to-peer network of hundreds of nodes as well as a billion nodes.

Another advantage of the disclosed systems and methods is that the peer-to-peer network is open to all the nodes on the Internet, which include physical devices and virtual nodes. The data-routing protocols are designed in a trustless manner, which makes it highly unlikely for malicious nodes to affect the operations of the whole peer-to-peer network for a considerable amount of time and scale.

Still another advantage of the disclosed systems and methods is that the faster paths can be determined between Internet-connected computer devices without the requirement of clock synchronization between the computer devices.

Yet another important aspect of the presently disclosed system and method is in its network security. The data messages and data packages sent between peer nodes can be cryptographically signed by the nodes involved using their private keys similar to blockchain technologies. The signatures can be verified using node identifications related to public keys.

Moreover, best data routing paths are calculated in a distributed fashion, which provides more robust and secure data transport. Decentralization of the protocol means that no single node should have an authority on the selected/proposed best paths. The best path calculation is distributed, which makes it easier for other peers to verify the legitimacy of the path candidates. The integrity of data routing operations can be secured by encryptions at all the peer nodes along the relayed routing path.

The disclosed decentralized network provides a buffer to the overall network load. Whenever or wherever a computer network is overburdened with traffic and experiences high latencies, the disclosed systems and methods can autonomously identify alternative routing paths and alleviate the traffic latency or congestion, which result in more consistent and reliable in the network's performance.

DETAILED DESCRIPTION OF THE INVENTION

To overcome the problems faced by the conventional network routing technologies, the present invention provides a decentralized system in which distributed nodes self-organize into a peer-to-peer computer network. Data transfer latencies and stabilities between nodes are continually measured and evaluated. When a data transport need arises between two nodes in the network, better performing paths between nodes are dynamically determined in the peer-to-peer computer network based on the up-to-date measured latencies and network stability.

Figure 1:
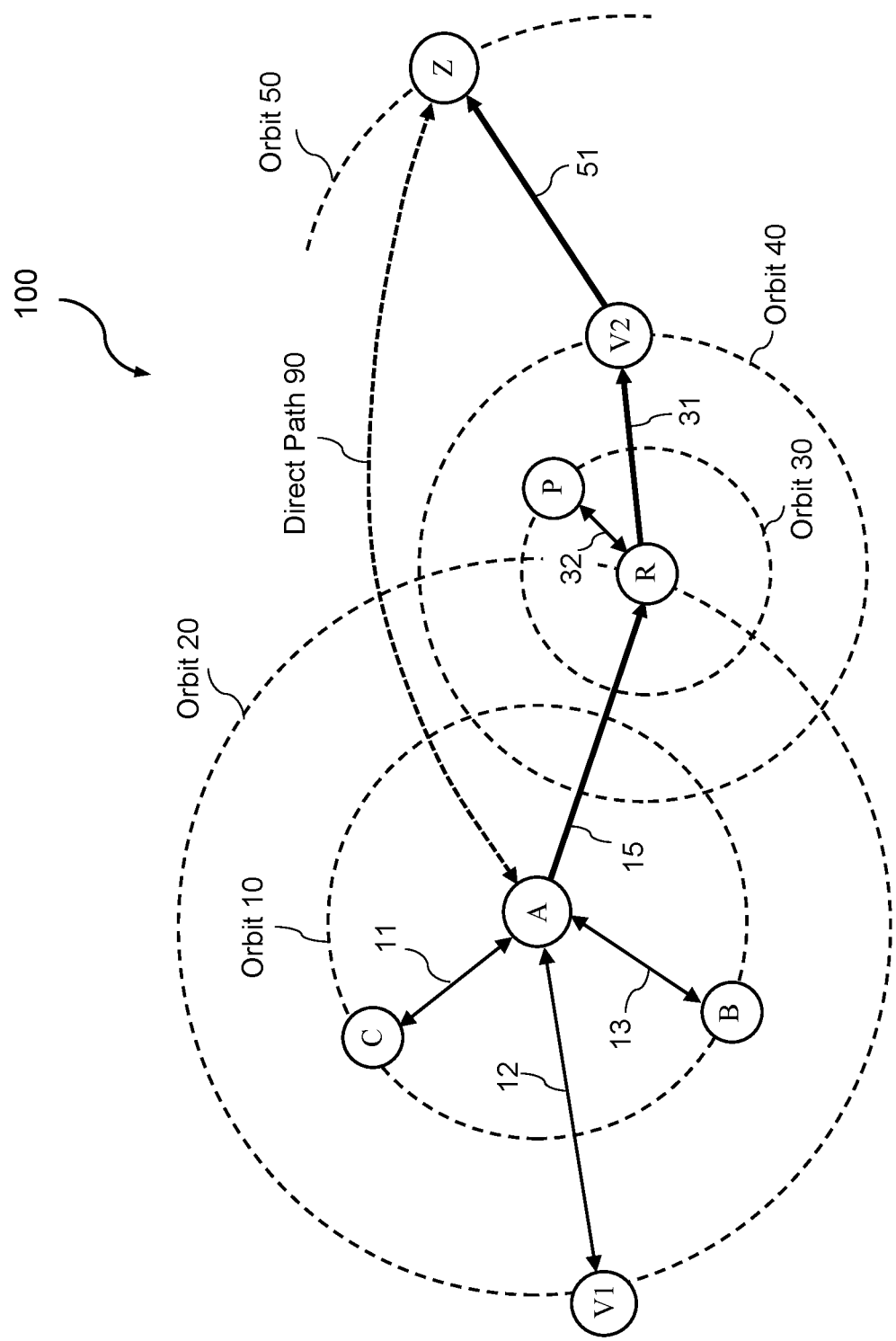
FIG. 1 shows a peer-to-peer computer network that is autonomously self-organized and updated, and that is capable of discovering best data routing paths in accordance with some embodiments of the present invention.

In some embodiments, referring to FIG. 1, a peer-to-peer computer network 100 includes a plurality of nodes A, B, C, V1, R, P, V2, Z, etc. Some of the nodes (e.g., A, B, C, R, P, Z) can be physical computer devices or systems which are connected on the Internet. Some of the nodes (e.g., V1, V2 . . . ) can be virtual nodes that virtual machines or virtual agents defined in a software defined network. The peer nodes in the peer-to-peer computer network 100 can communicates with each other in encrypted messages using public/private key pairs. The public key of a node can be obtained from the node ID of the node, which is available to all peer nodes in the peer-to-peer computer network 100. All the nodes in peer-to-peer computer network 100 are pre-installed computer codes which contain protocols that govern the communications among the nodes, the set-up, maintenance, and governance within the peer-to-peer computer network 100, and measurements, data path selection, and data routing within the peer-to-peer computer network 100.

Figure 2:
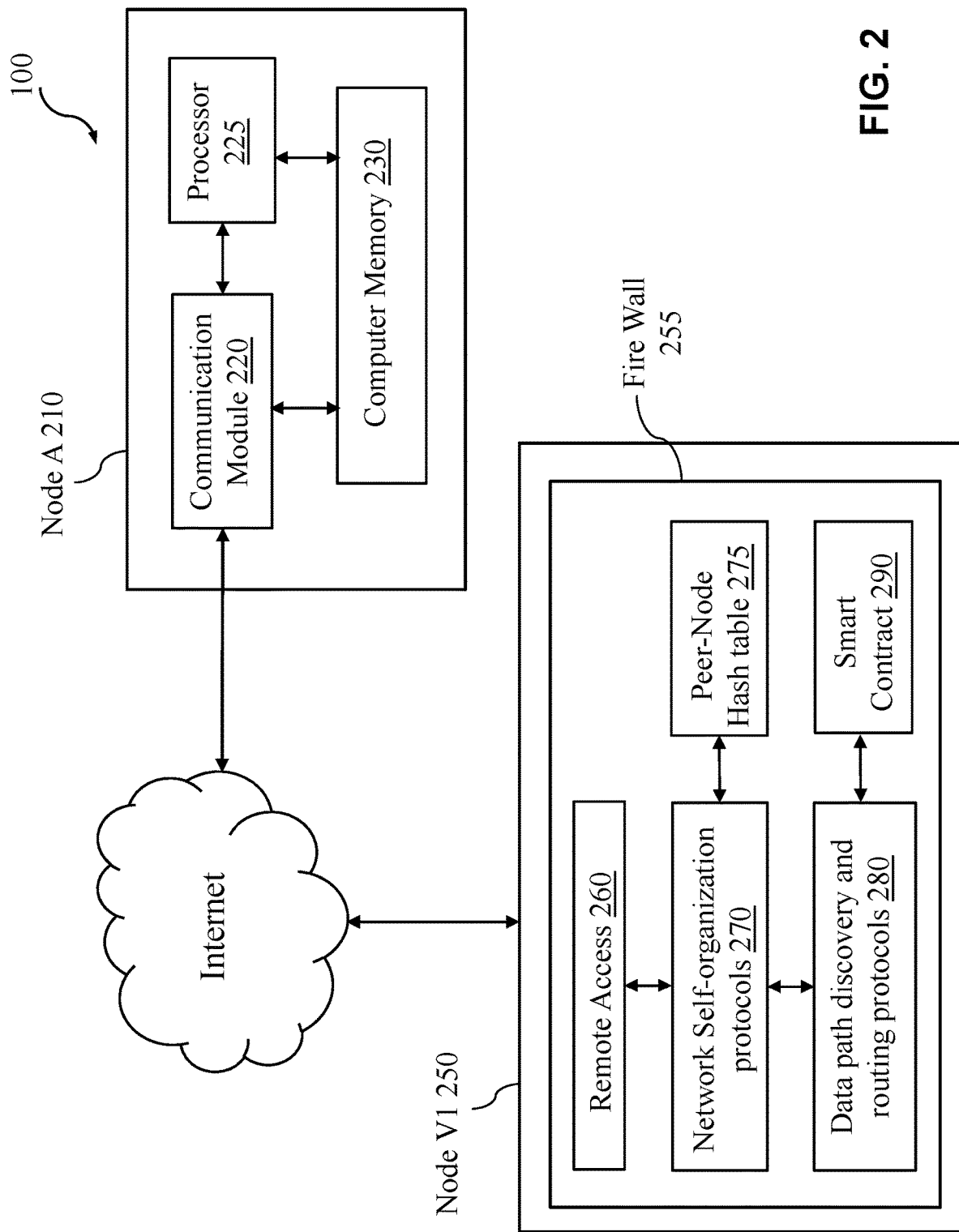
FIG. 2 shows details of exemplified nodes in a peer-to-peer computer network in accordance with some embodiments of the present invention.

FIG. 2 shows detailed components of two exemplified nodes node A 210 and node V1 250 in the peer-to-peer computer network 100. Node A 210 includes a communication module 220, a processor 225, and computer memory 230. The computer memory 230 stores computer codes that include instructions that define a distributed autonomous routing protocol (DARP), which can be executed by the processor 225 and the communication module 220. The components in the DARP are the same as those stored in a virtual node such as node V1 250, and their details are described below in conjunction with node V1 250.

The node V1 250 is a self-contained virtual system which resides in a host system or host device but isolated from the host by a firewall 255. A virtual node can run any executable or script that is supported by the operating system environment of the host system or host device. The node V1 250 includes a remote access module 260 that is configured to communicate with other nodes in the peer-to-peer computer network 100. The pre-installed DARP defines several applications or modules: network self-organization protocols 270, a peer-node hash table 275, data path discovery protocols 280, and smart contract 290. Analogously, these protocols and a peer-node hash table are stored in the computer memory 230 in the node A 210, which can be accessed and executed by the processor 225.

The peer-node hash table 275 can store IP addresses, port numbers, and protocols (such as TCP, UDP, DNS, etc.), which are information used to communicate with the nodes identified by the node IDs. The nodes may support multiple network protocols that can be used to exchange messages based on network parameters. Nodes can choose which protocol is best suited for a particular situation and switch when needed. Each node must have a Public/Private key pair in order to be able to join the network. A node ID is derived from the Public Key. The Public Key of node can also be obtained from Node ID, which allows other peer nodes to verify the authenticity of messages signed by this node. Thus, a node ID is not only an identifier for the node but can also be used to obtain the public key for decrypting messages sent by this node. Moreover, secure messages sent from other peer nodes to this node can be encrypted by the public key of this node, which can only be decrypted and read by the private key of this node.

The peer-node hash table 275 at each node contains information for a portion of the peer nodes (i.e., a portion of the global node ID hash table) in the whole peer-to-peer computer network. Importantly, other peer nodes can also query a peer-node even it is not stored in their own peer-node hash tables. Given each node is connected to the peer-to-peer computer network 100 and its node ID is stored in the peer-node hash tables at some peer nodes, any other node within the peer-to-peer computer network 100 may find it one way or another. Thus, with the sharing of information stored in peer-node hash tables, nodes in the peer-to-peer computer network 100 are not required to be directly connected for them to find each other. The node IDs and queries of the node IDs can be defined by Kademlia protocol.

The network self-organization protocols 270 stores instructions for tasks for autonomously setting up and maintaining the peer-to-peer computer network 100. Since there is no centralized command center, the peer-to-peer computer network 100 is formed and maintained solely by the distributed nodes therein, which makes the disclosed network more resilient against attacks and network failures. The disclosed peer-to-peer computer network 100 adopts a node-centric approach in organizing the relationship between a node and relationships to other nodes.

Referring to FIG. 1, node A is connected to node B, node C, node V1, and node R via connections 11, 12, 13, 15 respectively. These nodes that node A is connected to are stored as neighbor nodes at node A. Node A sends pulse messages to node B, node C, V1, R and some of the nodes reply and send return pulses back to node A. Using the time stamps of the pulse messages sent out and the reception time stamp of the return messages, node A can calculate round-trip times (RTTs) from the respective nodes. In some embodiments, the pulse messages can be based on User Datagram Protocol, TCP or DNS protocols. Node A organizes its neighbor nodes according to the measured values of the respective RTTs: for example, neighbor nodes having RTTs within [0, 10 ms] are placed in a first orbital bin; neighbor nodes having RTTs within (10 ms, 20 ms] are placed in a second orbital bin . . . . Graphically, the nodes can be visualized as located at different orbits around node A: node B and node C are on orbit 10 (~10 ms RTT) relative to node A, while node V1 and node R are located at an orbit 20 (~20 ms RTT) around node A, and so on.

In addition to data-transfer latencies, each node also measures jitters in its communication with other nodes. Details about latency measurements based on sending and reception time stamps and details about jitters in data transfer latencies between nodes are discussed in commonly assigned pending U.S. patent application Ser. No. 17/237,026, titled "Autonomously routing data using relay nodes pre-selected from a group of distributed computer nodes based on measured one-way latencies", filed Apr. 21, 2021, the content of which is incorporated herein by reference.

Since the peer-to-peer computer network 100 is a distributed system without a center, each of node B, node C, node V1, and node R measures RTTs from their respective neighbor nodes and organizes the respective neighbor nodes in a similar fashion as node A does, as described above. For example, node R is connected to neighbor node P with connection 32 and to neighbor node V2 via connection 31. Node P is located on an orbit 30 relative to node R and node V2 is located in an orbit 40 relative to node R. In a cascading fashion, all the updated nodes (current members) in the peer-to-peer computer network 100 are connected to each other: a first node is connected to its neighbors; each of the neighbors is connected to their respective neighbors.

Under the instructions of DARP, the RTTs between nodes are continually measured; the orbital bins around each node are regularly updated; nodes in the peer-to-peer computer network 100 are updated.

A distinct advantage of the presently disclosed system and method is that the latency measurements in the peer-to-peer computer network 100 does not require clock synchronization between peer nodes. Local clocks at different nodes can generally have skews or clock rate differences. The RTT measurements involves the subtraction of the reception time of a pulse message received by a neighbor node (or a candidate node) from the sending time (measured at the same node) of the return message back to the origination node. Thus, a skew in the clock at the neighbor node (or the candidate node) is cancelled out in the RTT measurement. In other words, offsets between clocks of a node and its neighbor nodes do not affect RTT measurements between peer nodes in the peer-to-peer computer network 100. Details about independence of latency measurement against clock offset in a disclosed decentralized network are discussed in commonly assigned pending U.S. patent application Ser. No. 17/237,026, titled "Autonomously routing data using relay nodes pre-selected from a group of distributed computer nodes based on measured one-way latencies", filed Apr. 21, 2021, the content of which is incorporated herein by reference.

Each node (e.g., A, B, C, V1, R, P, V2, Z) in the peer-to-peer computer network 100 is represented by a unique node identification (ID). Each node (physical or virtual) in the peer-to-peer computer network 100 stores a hash table of hash values of the node IDs of some neighbor nodes (current members, or the updated nodes) in the peer-to-peer computer network 100 and the nodes' IP addresses, port numbers and protocols. The hash values in the peer-node hash table allow allows the node to quickly query some current members (mostly connected neighbor nodes, as well as candidate nodes that may be selected to be connected to the current node) of the peer-to-peer computer network 100. For example, node V1 250 can query some current members of the peer-to-peer computer network 100 using the hash values stored in the peer-node hash table 275 (FIG. 2). Moreover, node V1 can send requests to its neighbor nodes to query a node using peer-node hash tables at the neighbor nodes. Since the nodes in the peer-to-peer computer network 100 are interconnected in the above-described cascading fashion, node V1 250 can find any node in the peer-to-peer computer network and sends messages or data to another node within the peer-to-peer computer network 100 and manage the relationship with the other nodes in the peer-to-peer computer network 100.

Referring to FIGS. 1 and 2, the data path discovery protocols 280 guides the operation tasks for identifying, evaluating, and selecting data routing paths and sending data between a source node to a destination node along a selected relayed data path within the peer-to-peer computer network 100. For example, when a need arises for node A (source node) to send data to node Z (destination node) within the peer-to-peer computer network 100, DARP can discover multiple candidate relayed data paths from node A to node Z by sending path packages, as described below in relation to FIG. 5, wherein each of the relayed data path includes at least one relay node that is a current member of the peer-to-peer computer network 100.

Under the guidance of DARP, a distributed node in the peer-to-peer computer network 100 can evaluate data-transmission latencies and jitters of the multiple candidate relayed data paths from node A to node Z. For example, a relayed data path from node A to node R to node V2 to node Z is identified and selected if the latencies and jitter meet preset criteria. This particular relayed data path includes two relay nodes (node R and V2 node) and three routing segments there in between: node A to node R; node R to node V2; and node V2 to node Z. The latencies of a relayed data path can be characterized by the total the one-way latency (OWL), which is the sum of OWLs from all the routing segments of the relayed data path. The data jitter in the relayed data path can be represented by an average of data jitter in the routing segments that constitute the relayed data path. In parallel, node A sends pulse one or more path packages directly to node Z in a direct path as defined by conventional network routing protocols, which results in a measurement of the one-way latency for the direct path. If the total OWL in a relayed data path is shorter than the OWL of the direct path and the jitter in the relayed data path is below a threshold, that relayed data path can be selected to route data from node A to node Z, which gives better data-transport performance that the conventional method along the direct path. Another advantage of the presented disclosed methods and systems is that the total measured OWL of a relayed data path in the peer-to-peer network is independent from the clock skews or offsets at the relay nodes along the relayed data path. The total measured OWL is determined by the sending time of the path package at the source node (e.g., node A) and the reception time of the path package at the destination node (e.g., node Z). Details about one-way latencies along a relayed data path comprising one or more relay nodes and its independence of the clocks of the relayed nodes are discussed in commonly assigned pending U.S. patent application Ser. No. 17/219,884, titled "Automated formation and optimization of a group of nodes for distributed data routing over computer networks", filed Apr. 1, 2021, the content of which is incorporated herein by reference.

Referring to FIG. 2, the smart contract 290 defines obligations and incentives for each node relative to the peer-to-peer computer network 100 and relative to each other. For example, after successful data transfer via a relayed data path, the relayed nodes can be paid by tokens typically by the source node that has initiated the data transfer. The successful completion of data transfers and token transactions can be validated and recorded by peer nodes on a blockchain. In addition, those peer nodes that function as relay nodes can be validated and awarded by tokens for continuing to up and available to route data for its peers. These above and other conditions are defined in the smart contract, which are pre-agreed when nodes install DARP codes. Details about governance and utility of a decentralized data routing system including obligations and incentives of the peer nodes are disclosed in commonly assigned pending U.S. patent application Ser. No. 17/237,026, titled "Autonomously routing data using relay nodes pre-selected from a group of distributed computer nodes based on measured one-way latencies", filed Apr. 21, 2021 and commonly assigned pending U.S. patent application Ser. No. 17/463,883, titled "Utility and governance for secure, reliable, sustainable, and distributed data routing over the Internet", filed Sep. 1, 2021. The content of these patent applications is incorporated herein by reference.

Figure 3:
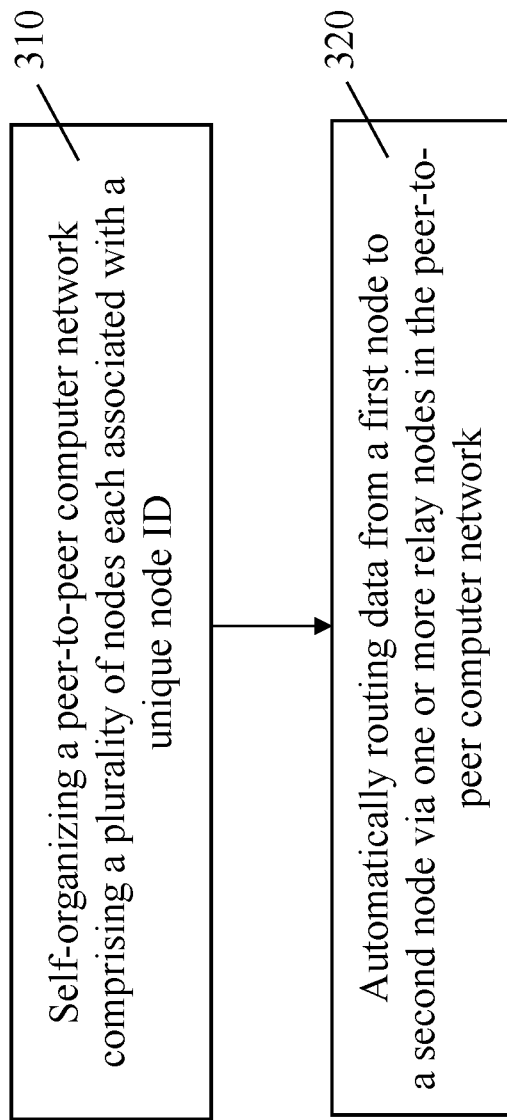
FIG. 3 is a flowchart for autonomously self-organizing a peer-to-peer computer network and routing data between nodes in the peer-to-peer computer network in accordance with some embodiments of the present invention.

Referring to FIG. 3, the method for autonomously routing data using in a peer-to-peer computer network (e.g., 100) can include two processes each comprising multiple steps: self-organizing a peer-to-peer computer network comprising a plurality of nodes each associated with a unique node ID (step 310) and automatically routing data from a first node to a second node via one or more relay nodes in the peer-to-peer computer network (step 320). Step 310 is related to setting up and maintaining a functional peer-to-peer computer network capable of routing data within the network. Each node in peer-to-peer computer network is represented by a unique ID. Hash values of these node IDs are stored in a peer-node hash table (e.g., 275 in FIG. 2). Step 320 involves the process of identifying, evaluating, and selecting relayed data paths for routing data between peer nodes in the peer-to-peer computer network. As described below in relation with FIGS. 4 and 5, the relay node is an updated node in the peer-to-peer computer network.

Figure 4:
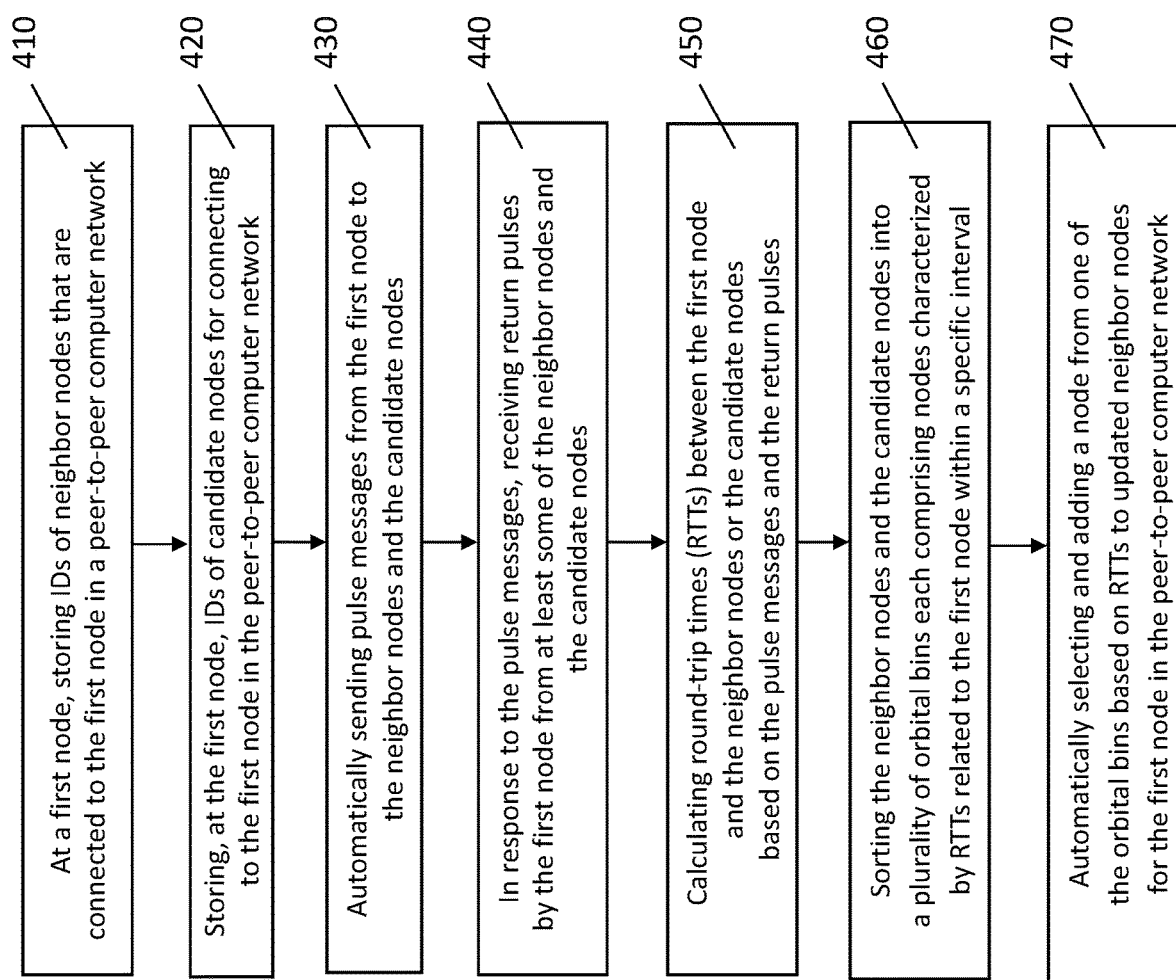
FIG. 4 is a detailed flowchart for self-organizing the peer-to-peer computer network in relation to FIG. 3.

The process of self-organizing a peer-to-peer computer network comprising a plurality of nodes each associated with a unique node ID (step 310) can include one or more of the following steps. Referring to FIG. 4, the first node in a peer-to-peer computer network stores information about of its neighbor nodes in the peer-to-peer computer network (step 410). In the example shown in FIG. 1, node A stores information of its neighbor nodes, such as node B, node C, node V1, and node R that node A is connected to in the peer-to-peer computer network. The information can include node IDs and other properties (such as IP addresses, port numbers, and protocols) of the neighbor nodes, which as described above can be stored in a peer-node hash table (e.g., 275 in FIG. 2).

Optionally, the first node can also store information about candidate nodes that are currently not neighbor nodes of the first node, but can become neighbor nodes to the first node in the future (step 420). The candidate nodes are nodes that the first node is aware of and has incrementally stored previously. In some embodiments, the candidate nodes can be shared by the neighbor nodes of the first node. For example, in FIG. 1, Node A's neighbor nodes, i.e., node B, node C, node V1, and node R are in communication with node A. Under DARP protocols, these node A's neighbor nodes can share with node A about the nodes they are respectively connected to and are aware of. For instance, the candidate nodes stored at node A can include nodes that are connected to node B, node C, node V1, and node R, such as node P and node V2 that are connected to node R. The candidate nodes allow node A to explore a larger pool of nodes and to expand its network of neighbor nodes in each update. At the same time, some of the nodes that node A has been connected may become unstable or non-responsive or non-performing (e.g., increased data latencies or increased data jitter), these nodes may be dropped off from node A's connections (i.e., Node A's list of neighbor nodes, with more details described below). The balance of expansion and trimming of neighbor nodes (i.e., updated connection with the first node) assures a healthy operational peer-to-peer computer network.

In general, nodes are self-managed and self-organized in the peer-to-peer computer network based on the performance by the data connections between the nodes. Thus, the nodes in the peer-to-peer computer network are required by DARP protocols to continually measurement performance characteristics (e.g., latency, jitter, etc.) of their connections. Based on the most updated performance measurements, the peer-to-peer computer network dynamically refresh its members: some good performing nodes are added to neighbor nodes, and some non-response or bad performing nodes are removed from neighbor nodes. The updated neighbor nodes for all nodes in the peer-to-peer computer network form the updated nodes for the peer-to-peer computer network. To this end, pulse messages are regularly automatically sent from the first node to the neighbor nodes and the candidate nodes (step 430). Each of the pulse messages is characterized by a sending time stamp at the first node.

In response to the pulse messages, the first node receives return pulses from at least some of the nodes in the neighbor nodes and the candidate nodes (step 440). Each of the return pulses is characterized by a reception time stamp at the first node. Similarly, each of the pulse messages sent from the first node to one of the neighbor nodes or the candidate nodes is associated with a sending time stamp.

Next, round-trip times (RTTs) between the first node and its neighbor nodes or its candidate nodes are calculated based on the pulse messages and the return pulses (step 450). Each of the return messages is characterized by a reception time stamp. Since both sending and reception times are measured at the first node, thus RTT calculations are independent of the clocks at the neighbor nodes and the candidate nodes. A neighbor node or a candidate node receives a pulse message from the first node at a reception time and sends a return message back to the first node at a transmittance time. The reception time and transmittance time cancel out each other in the calculation of the RTT at the first node using the transmittance time of the pulse message at the first node and the reception time of the return message at the first node. However, RTT measurement may be affected by clock rate differences between the first node and the neighbor node or the candidate node. In some embodiments, the RTT calculations between the first node and neighbor nodes or the candidate nodes in step 450 can compensate the clock rate differences between different nodes. The first node can send pulse messages to a neighbor node or a candidate node at regular time intervals and receive return messages at regular time intervals. The return messages include transmittance times at the neighbor node or the candidate node. The clock rate of the neighbor node or the candidate node can be calculated using the transmittance times. In RTT calculations, the time gap between the reception time and the transmittance time at the neighbor node or the candidate node can be adjusted according to the difference between the clock rates at the first node and the neighbor or candidate node. In other words, the RTT measurements and calculations can be independent of the clock skews or clock rate discrepancies at the counterpart testing nodes. In the presently disclosed method, RTTs are used for monitoring connection performances between pairs of neighboring nodes in the peer-to-peer computer network.

The neighbor nodes and the candidate nodes are then sorted into a plurality of orbital bins each comprising nodes characterized by RTTs related to the first node within a specific interval (step 460). As noted above, each orbital bin is defined by a range of RTT such as [0 ms, 5 ms], [5 ms, 10 ms] . . . , etc. In one respect, nodes in different orbital bins can be considered being at different distances from the first node in relation to data transport. The spread in "data transport distances" between the orbital bins assures an optimal reach of the first node's connections with its neighbor nodes. The nodes that have not successfully updated with RTTs are not sorted in the orbital bins.

From each of the orbital bins, at least one node is automatically selected based on RTTs associated with the node. The selected node is added to updated neighbor nodes for the first node (step 470). The sum of updated neighbor nodes of all the nodes in the peer-to-peer computer network form the updated nodes in the peer-to-peer computer network (step 470).

Within an orbital bin, a node having a shorter RTT can be selected, which gives a faster data transport within RTT range of that orbital bin. Moreover, the node selection within each orbital bin can also take into account of jitters, bandwidths, clock rate differences, and other performance parameters measured by the pulse messages and the return pulses at the first node. A node will not be selected if measured jitters, bandwidths, clock rate differences, and other performance parameters exceeding a respective threshold. It should be noted that the neighbor nodes and the candidate nodes that are non-responsive to the pulse messages from the first node do not lead to updated RTT calculations and are not sorted into the orbital bins. These non-response nodes are thus discarded if some of them were on members of the peer-to-peer computer network. Furthermore, those nodes that have recently measured jitter exceeding a predetermined threshold can also be removed from the list of updated nodes in the peer-to-peer computer network if they have been.

In some embodiments, when two nodes in the same orbital bin have similar performances (in latencies and jitter), the node that has been an updated node in the peer-to-peer computer network for longer duration is selected. This criterion is based on the observation that nodes that have shown longer period of reliable performance more likely provide more reliable performance in the future.

Steps 410-470 are repeated for other nodes (e.g., B, C, V1, R, P, V2, Z, etc.) in the peer-to-peer computer network. In this way, node connections are regularly evaluated between pairs of neighboring nodes; the neighbor nodes are regularly updated. These node updating steps are repeated and propagated throughout the peer-to-peer computer network.

Figure 5:
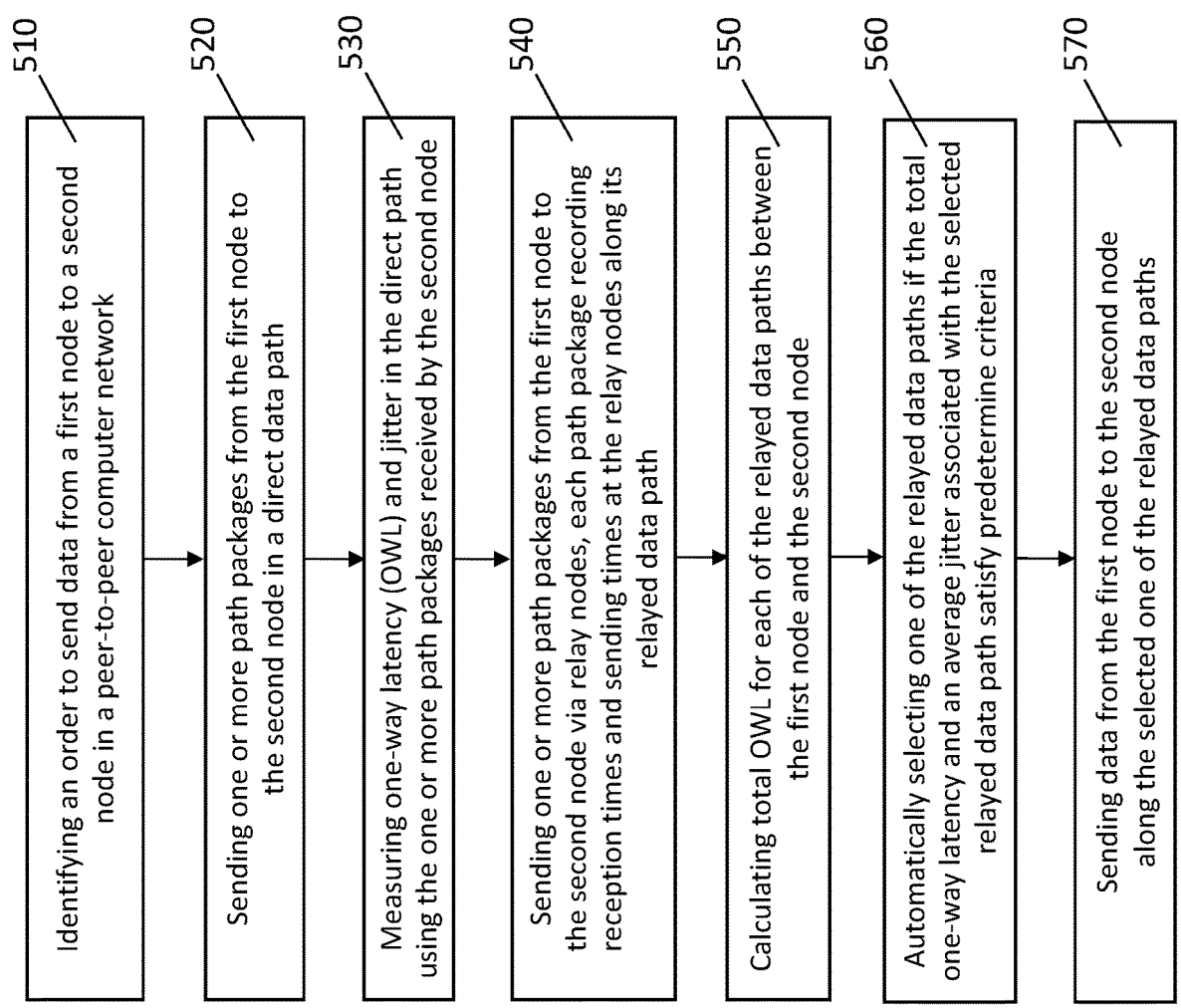
FIG. 5 is a detailed flowchart for autonomously routing data from a source node to a destination node in the peer-to-peer computer network in relation to FIG. 3.

The process of automatically routing data from a first node to a second node in the peer-to-peer computer network (step 320 in FIG. 3) can include one or more of the following steps. Referring to FIG. 5, an order or a need is first identified to send data from a first node to a second node in a peer-to-peer computer network (step 510). The IP address of the second node is looked up using second node's ID on the peer-node hash table (275 in FIG. 2) stored at the first node. One or more path packages are sent from the first node to the second node in a direct data path (step 520) as defined by conventional Internet routing. Each path package records all the timestamps from the first node, all the intermediate hops along the direct path, and the second node. One-way latency (OWL) and jitter are measured in the direct path between the first node and the second node using the one or more path packages received at the second node (step 530).

The OWL of the direct path is the reception time at the second node subtracted by the sending time recorded at the first node. The conventional direct data path is used as a benchmark for the improved performance of the relayed data paths.

Next, relayed paths between the first node and the second node are searched for and selected. One or more path packages are sent from the first node to the second node via relay nodes (step 540). Each path package records the reception time and the sending time at each relay node along its path as well as the sending time at the first node. Each of the relayed data paths includes one or multiple relay nodes that are from the updated nodes in the peer-to-peer computer network (step 540). Using FIG. 1 as an example, when node A wants to find relayed paths to node Z, node A sends path packets to its neighbor nodes in the orbital bins (e.g., node B, C, R, V1, etc.). Thus, the updated neighbor nodes have been recently updated using pulse messages and RTT and jitter measurements as described above. Each of the neighbor nodes receiving a path packet records a reception timestamp and a seconding timestamp to the path package. Then, the node A's neighbor node transmits this updated path packet forward to its neighbor node (e.g., from node R to node P and node V2). The relaying operation is repeated until the destination node is reached, or certain constraints are not met anymore (e.g., the number of hops has exceeded the maximum number of hops along each relayed path). Thus, a path packet that is successfully arrives the destination node Z includes the timestamps of all the intermediate hops for the specific relayed path.

An important aspect for the presently disclosed cascaded path packages is in its network security. At each hop, a relay node cryptographically signs the path packet with its private key paired with a public key of the relay node. Thus, the destination node (or the second node) can cryptographically verify the integrity and authenticity of all the hops (or routing segments) along the relayed path. Thus, no intermediate node can alter hop timestamps or the list of hops. In some embodiments, the construction of a path packet along the data path (a potential data relay path) can include the following steps: the source node builds a path packet describing constraints (e.g., the maximum number of hops allowed along the relayed path) and the destination node; the source node cryptographically signs the path packet using the node ID of the source node, the node ID of the destination, the node ID of the first hop node (i.e. the first hop), and sends this path packet to the first relay node along with the signature; the first hop node records OWL, jitter, etc. of this hop; the first hop node cryptographically signs the path packet using the source node signature, recorded OWL, jitter, etc. and the node ID of the second hop node, and sends the updated path package to the second hop node; the second hop node repeats the steps of the first hop node; and these steps are repeated till the path package is received by the destination node. The destination node receives a chain of signatures that each depends on the previous signatures as well as recorded measurements along each routing segment, which prevents the content of the path packet from being altered by the intermediate malicious nodes. (When a data path is indeed selected for data routing, its hop nodes will function as relay nodes for data routing.)

In the above described method, the first node (the source node) can find the second node (the destination node) even if they are not directly connected or the second node is not listed in the peer-node hash table of the first node. Moreover, the relay nodes may or may not be directly connected to the first node (the source node) or the to the second node (destination node). Additionally, these relay nodes have been recently or currently updated by their respective neighbor nodes, which means that they provide good data transfer performance via their connections. In some embodiments, the search for the destination node is enabled by Kademlia protocol, which allow a node to find information (node ID etc.) about a previously unseen node that is connected to the whole peer-to-peer computer network, and to send path packets to that node.

For each path package that is originated from the first node and received by the second node, the total OWL for each of the relayed data paths between the first node and the second node is calculated (step 550). Since the sending time and reception time are recorded by the path package for each routing segment, the OWL for each routing segment is simply the difference between the reception time of the receiving node subtracted by the sending time of the sending node for that routing segment. The total OWL for the relayed path from the first node to the second node is the sum of all the OWLs of the routing segments along the relayed path. Since each relay node resends the next path package right after it receives one, the clock skew or clock discrepancy is cancelled out between the reception time and the sending time at the relay node. In other words, the total OWL is independent from the clock discrepancies at the relay nodes along the relayed path. Details about one-way latencies along a relayed path and its independence of the clocks of the relayed nodes are discussed in commonly assigned pending U.S. patent application Ser. No. 17/237,026, titled "Autonomously routing data using relay nodes pre-selected from a group of distributed computer nodes based on measured one-way latencies", filed Apr. 21, 2021, the content of which is incorporated herein by reference.

One of the relayed data paths is automatically selected if a total OWL and an average jitter associated with the relayed data path satisfy predetermine criteria in comparison to the direct path (step 560). The selected relayed data path is the best performing among all the relayed path with lowest total OWL and data transfer jitters below a threshold. The selected relayed data path also has a total OWL shorter than the OWLs of other identified relayed data paths and the direct data path. The average jitter associated with a relayed data paths from the first node to the second node is calculated by a mean of jitters measured at all routing segments along the relayed data path. Details about jitters in data transfer latencies between nodes are disclosed in commonly assigned pending U.S. patent application Ser. No. 17/237,026, titled "Autonomously routing data using relay nodes pre-selected from a group of distributed computer nodes based on measured one-way latencies", filed Apr. 21, 2021, the content of which is incorporated herein by reference.

Once a relayed data path is selected within the peer-to-peer computer network, the first node can send data to the second node along the selected one of the relayed data paths (step 570). It should be noted that the relay nodes can be physical nodes or SDN-defined virtual nodes in the peer-to-peer computer network. After successful relayed data routing, the relay nodes can be subsequently rewarded by the party (typically the first node or the source node) that has requested the data transport. The award can be in the form a transfer of tokens. The transactions can be recorded on a blockchain. Details about the awards, validation of transactions, and related tokenomics are disclosed in commonly assigned pending U.S. patent application Ser. No. 17/237,026, titled "Autonomously routing data using relay nodes pre-selected from a group of distributed computer nodes based on measured one-way latencies", filed Apr. 21, 2021 and commonly assigned pending U.S. patent application Ser. No. 17/463,883, titled "Utility and governance for secure, reliable, sustainable, and distributed data routing over the Internet", filed Sep. 1, 2021. The content of these patent applications is incorporated herein by reference.

Figure 6:
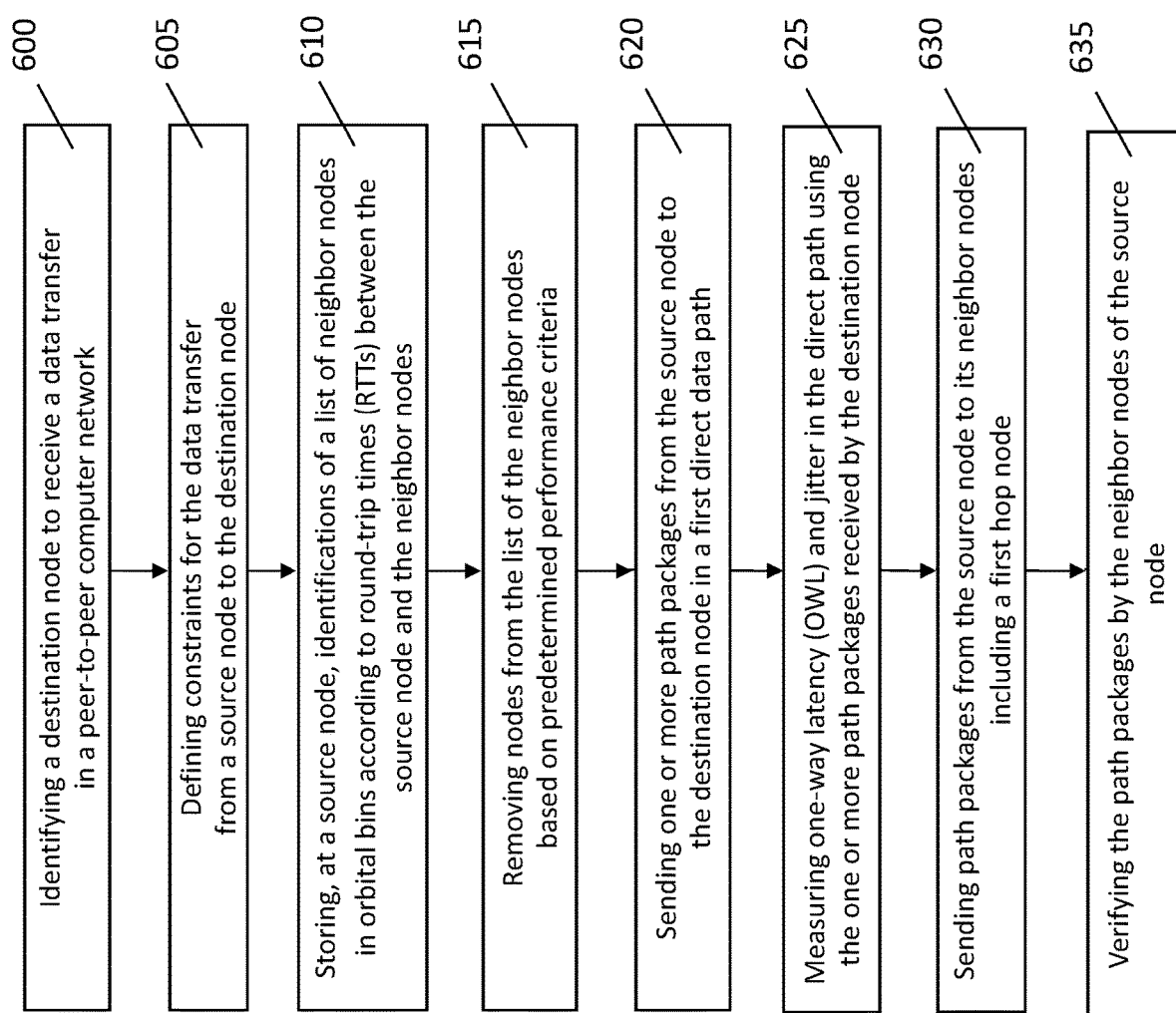
FIG. 6 is a flowchart for autonomously self-organizing nodes and autonomously finding best data routing paths between nodes in a peer-to-peer computer network in accordance with some embodiments of the present invention.
Figure 6:
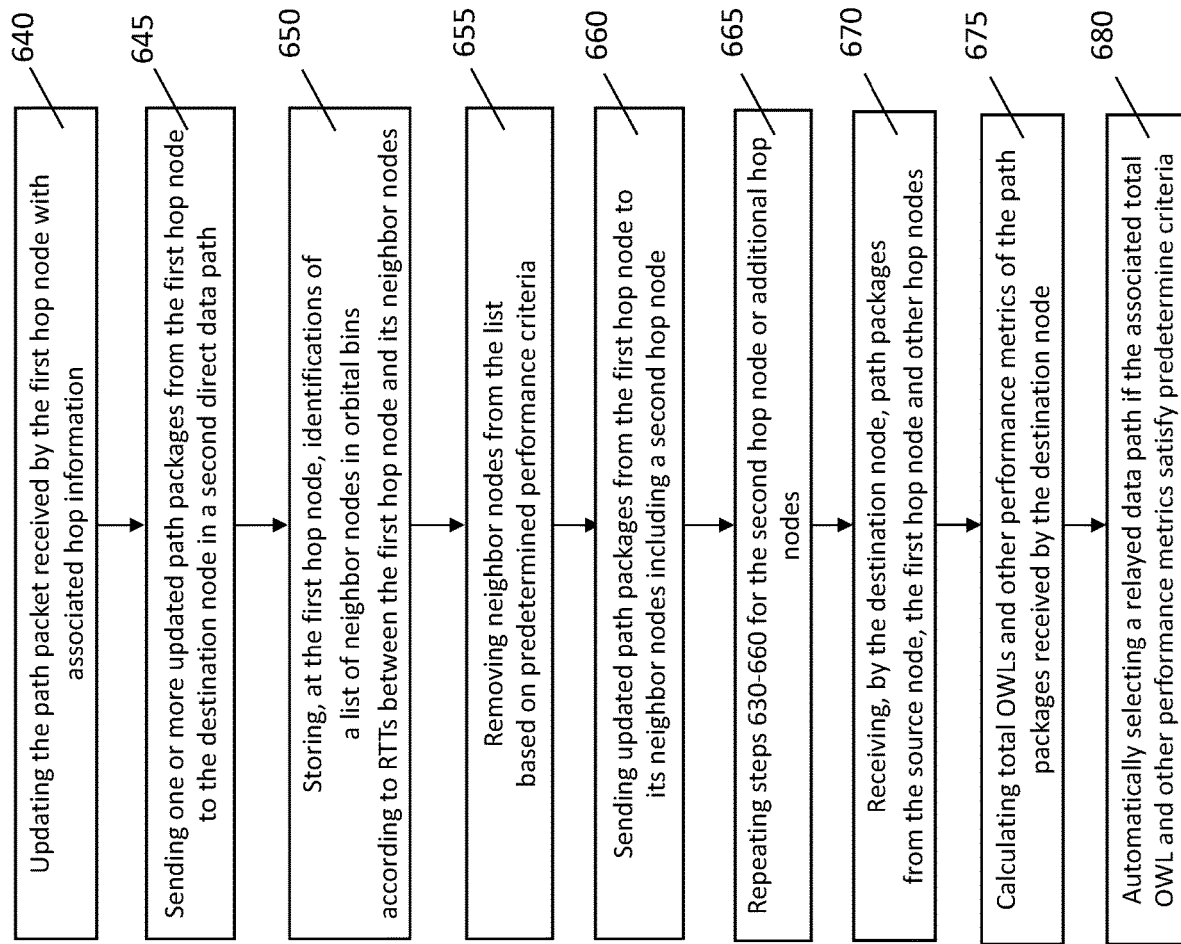

In some embodiments, referring to FIG. 6, the process of autonomously self-organizing nodes and autonomously finding best data routing paths between nodes in a peer-to-peer computer network can include one or more of the following steps: when a source node has the need to send data to a destination node in a peer-to-peer computer network, the destination node is identified to receive a data transfer in the peer-to-peer computer network (Step 600). As described above, the nodes in the peer-to-peer computer network are identified by their node IDs. The node ID of a node can be derived from the public key of that node. The public key of node can also be obtained from Node ID. Other peer nodes can use the public key to authenticate a message cryptographically signed by this node using a private key (that is paired with the public key). The node ID (and the IP addresses, port numbers and protocols) of a node in the peer-to-pee network is stored in peer-node hash tables (275, FIG. 2) of some other peer nodes (e.g., neighbor nodes). Since the nodes in the peer-to-peer computer network are interconnected in a cascading fashion (to neighbors, and in turn to neighbors' neighbors), a node can find any current peer node in the peer-to-peer computer network using Kademlia protocol and can send messages or data packages to any other peer node within the peer-to-peer computer network.

Optionally, constraints for the data transfer from the source node to the destination node are defined (step 605). Such constraints can include a maximum latency (defined by the total one-way latency along a routing path), a maximum jitter for the data transfer (i.e., variations in the data transfer latencies), and the maximum number of hops (i.e., number of relay nodes) allowed in a relayed data path from the source node to the destination node. The constraints can also be based on bandwidths, clock rate differences, etc.

As disclosed in detail in relation to FIGS. 1 and 2 and steps 410-460 in FIG. 4, the source node stores a list of neighbor nodes associated with a source node in orbital bins according to round-trip times (RTTs) between the source node and the neighbor nodes (step 610). The list of neighbor nodes stored at the source node can be sorted into orbital bins ranked by RTT values such as [0, 10 ms], (10 ms, 20 ms], etc. It should be noted, as described above in relation to step 470 (FIG. 4), that the neighbor nodes can be sorted in orbital bins based on other parameters such as jitters, bandwidths, and clock rate differences measured by pulse messages and return messages between the source node and the neighbor nodes. Furthermore, as described above in relation to step 450 (FIG. 4), RTT calculations can compensate for close rate differences between source node and the neighbor nodes.

The list of the neighbor nodes can be updated by removing nodes based on predetermined performance criteria (step 615). For example, if recently measured RTTs and/or jitters between the source node and some of the nodes do not satisfy performance criteria (RTT too long or data-transfer jitter too large), these nodes can be removed from the list of neighbor nodes at the source node. Furthermore, new nodes can also be added to the list of neighbor nodes associated with the source node as previously described (step 470 in FIG. 4).

The source node can send one or more path packages to the destination node in a from direct data path (step 620) from the source node to the destination node. The direct path is defined by conventional network routing protocols. One-way latency (OWL) and jitter in the direct path are measured using the one or more path packages received by the destination node (step 625). Each path package is associated with a sending time recorded by the source node and a reception time recorded at the destination node. An OWL can be calculated using the reception time and the sending time independent of clock skew that may exist between the destination node and the source node as described in step 530 (FIG. 5) and step 675 below. The OWL and jitter measured in the direct path are used as a benchmark for the candidate relayed data paths between the destination node and the source node.

To find relayed data paths, path packages are sent from the source node to its neighbor nodes (step 630). The neighbor nodes include a first hop node (step 630). Each pack package can contain sending time recorded by the source node as well as a signature of the source node. The signature of the source node, as described above, can be verified by the public key (which can be obtained from the node ID) of the source node. As discussed previously in relation with step 540 (FIG. 5), a node in the peer-to-peer network such as the source node may only be connected to a subset of all the nodes in the peer-to-peer network. But using Kademlia protocol, a node in the peer-to-peer network can find and reach another peer node in the peer-to-peer network by querying the other peer node at peer-node hash tables at different nodes and by sending cascaded path packages through the peer-to-peer network. In this step, the source node can send path packages simultaneously to all the updated neighbor nodes stored in the peer-node hash table (275, FIG. 2) at the source node.

Optionally, for security purpose, the neighbor nodes can verify the path packages received from the source node (step 635). The neighbor nodes such as the first hop node can verify a cryptographic signature in the path package signed by the source node. If the path package is signed using a private key of the source node, the signature can be authenticated using a public key of the source node that is paired with its private key. As discussed above, the ID and the public key of the source node can be queried (e.g., using peer-node hash tables 275 in FIG. 2) by the neighbor nodes in the peer-to-peer network. For multi-hop path packages (step 665), a neighbor node can also verify the hop number and the signatures by the source node and all the intermediate hop nodes associated with the path package.

The first hop node can update the path packet by with associated hop information (step 640). The updated hop information can include reception time at the first hop node, the sending time of the path package to the next hop node or the destination node (step 645 and step 660 below) as well as a signature cryptographically signed by the first hop node. The updated hop information is inserted into the path packet to be sent to the next hop node or the destination node.

Next, one or more path packages can be sent from the first hop node to the destination node in a second direct data path (step 645) from the first hop node to the destination node. This step terminates additional hops and will be used to evaluate a relayed data path comprising only one relay node: the first hop node.

As discussed above in relation to FIGS. 1 and 2 and steps 410-460 in FIG. 4, and similar to step 610 relating to the source node, the first hop node can store information of a list of neighbor nodes associated with in orbital bins according to RTTs between the first hop node and its neighbor nodes (step 650). Similar to step 615, neighbor nodes can be removed from the list based on predetermined performance criteria (step 655), which can include removal of nodes having RTT or data-transfer jitter over allowed respective thresholds. Furthermore, new nodes can also be added to the list of neighbor nodes associated with the first hop node as previously described. Moreover, as described above in relation to step 470 (FIG. 4), the neighbor nodes can be sorted in orbital bins based on other parameters such as jitters, bandwidths, and clock rate differences measured by pulse messages and return messages between the first hop node and its neighbor nodes. Furthermore, as described above in relation to step 450 (FIG. 4), RTT calculations can compensate for close rate differences between first hop node and its neighbor nodes.

Steps 660 and step 665 can be skipped if the constraints defined in step 605 specify a maximum number of one hop node (that is, only the first hop node or one relayed node is allowed in a relayed data path).

Furthermore, path packages updated with the hop information at the first hop node can be sent from the first hop node to its neighbor nodes including a second hop node (step 660). These path packages are used to evaluate relayed data paths that include additional relay nodes (e.g., the second hop node, etc.). Then, steps 635-660 described above relating to the first hop node can be repeated for the second hop node or additional hop nodes (step 665). Using FIG. 1 as an example, node A can be the source node, node R can be the first hop node, node V2 can be the second hop node, and without limiting to only two hop nodes, the destination node can be node Z.

In the cascading manner as described above, steps 630-665 can reach all the peer nodes that are currently on the updated lists of neighbor nodes of one or more nodes in the peer-to-peer network. Under the Kademlia protocol, because each peer node is connected to multiple of its neighbors, all peer nodes are inter-connected; the source node will always have one or more pathways to reach the destination node in the same peer-to-peer network.

The destination node receives all the path packages received from the source node (in the first direct path), from the first hop node (one hop then in the second direct path), and from other hop nodes (multiple hops) (step 670). The path packages include information recorded at the source node as well updated information recorded at the intermediate hop nodes. Each of the path packages includes the IDs of the source node and the intermediate hop nodes, the sending times and the reception times from the source node to all the hop nodes, as well as cryptographic signatures by all the nodes along the paths. The signatures can be used for verifications using the public keys of the associated nodes. These path packages represent possible relayed data routing paths between the source node and the destination node with the first direct path being the benchmark.

The total OWLs and other performance metrics are then calculated for the potential data routing paths associated with the path packages (step 675) received by the destination node. As described above in relation to step 550 in FIG. 5, the total OWL for the relayed path from the source node to the destination node is the sum of the OWLs of all the routing segments along the relayed data path (via one or more hop nodes). Since each hop node resends the updated path package right after the last version of the path package was received, the clock skew is cancelled out between the reception time and the sending time at the relay node. In other words, the total OWL is independent from the clock skews at the hop nodes along a relayed data path that is being evaluated. Details about one-way latencies along a relayed path and its independence of the clocks of the relay/hop nodes are discussed in commonly assigned pending U.S. patent application Ser. No. 17/237,026, titled "Autonomously routing data using relay nodes pre-selected from a group of distributed computer nodes based on measured one-way latencies", filed Apr. 21, 2021, the content of which is incorporated herein by reference. Other performance metrics calculated at the destination node can include jitter or variations in data-transfer times, bandwidths of data throughput, clock rate differences, and the number of hops in a relayed data path.

A relayed data paths can be automatically selected for transferring data from the source node to the destination node based on the path packages received by the destination node if the associated total OWL and other performance metrics satisfy predetermine criteria (step 680). The selected relayed path includes one or more relay nodes, which are the hop nodes such as the first hop node, the second hop node . . . used in finding data routing paths from the source node to the destination node. Typically, the data routing path having the lowest OWL and jitter can be selected. The predetermine criteria can require each relayed data path to have an OWL and jitter to be below respective thresholds (that low latency and low variation). The predetermine criteria can include a comparison of a potential relayed data path against the (first) direct path from the source node to the destination node: at least one of OWL and jitter should exceed the data-transfer performance of the direct path. The predetermine criteria can also be related to the constraints for the data transfer described in step 605. For example, the constraints can specify a maximum number of hops to be 2, thus all potential relayed data paths having more than two hop nodes can be discarded from the evaluation. Using data path packages received, the destination node can maintain a list of potential data routing paths including the currently selected data routing path. The extra data routing paths can be used as alternative routing paths to the first selected path.

One or more of the above steps (610-615, 640-645) can be implemented by or under the data path discovery and routing protocols 280 (in FIG. 2). One or more of the above steps (600, 605, 620-635, 650-680) can be implemented by or under the network self-organization protocols 270 (in FIG. 2).

Once a relayed data path is selected within the peer-to-peer computer network, the source node can send data to the destination node along the selected one of the relayed data paths similar to step 570. It should be noted that the source node, the destination node, as well as the relay nodes can be physical nodes or SDN-defined virtual nodes in the peer-to-peer computer network. After successful relayed data routing, the relay nodes can be subsequently rewarded by the party (typically the first node or the source node) that has requested the data transport. The award can be in the form a transfer of tokens. These transactions can be recorded on a blockchain. Details about the rewards, validation of transactions, and related tokenomics are disclosed in commonly assigned pending U.S. patent application Ser. No. 17/237,026, titled "Autonomously routing data using relay nodes pre-selected from a group of distributed computer nodes based on measured one-way latencies", filed Apr. 21, 2021 and commonly assigned pending U.S. patent application Ser. No. 17/463,883, titled "Utility and governance for secure, reliable, sustainable, and distributed data routing over the Internet", filed Sep. 1, 2021. The content of these patent applications is incorporated herein by reference.

Figure 7:
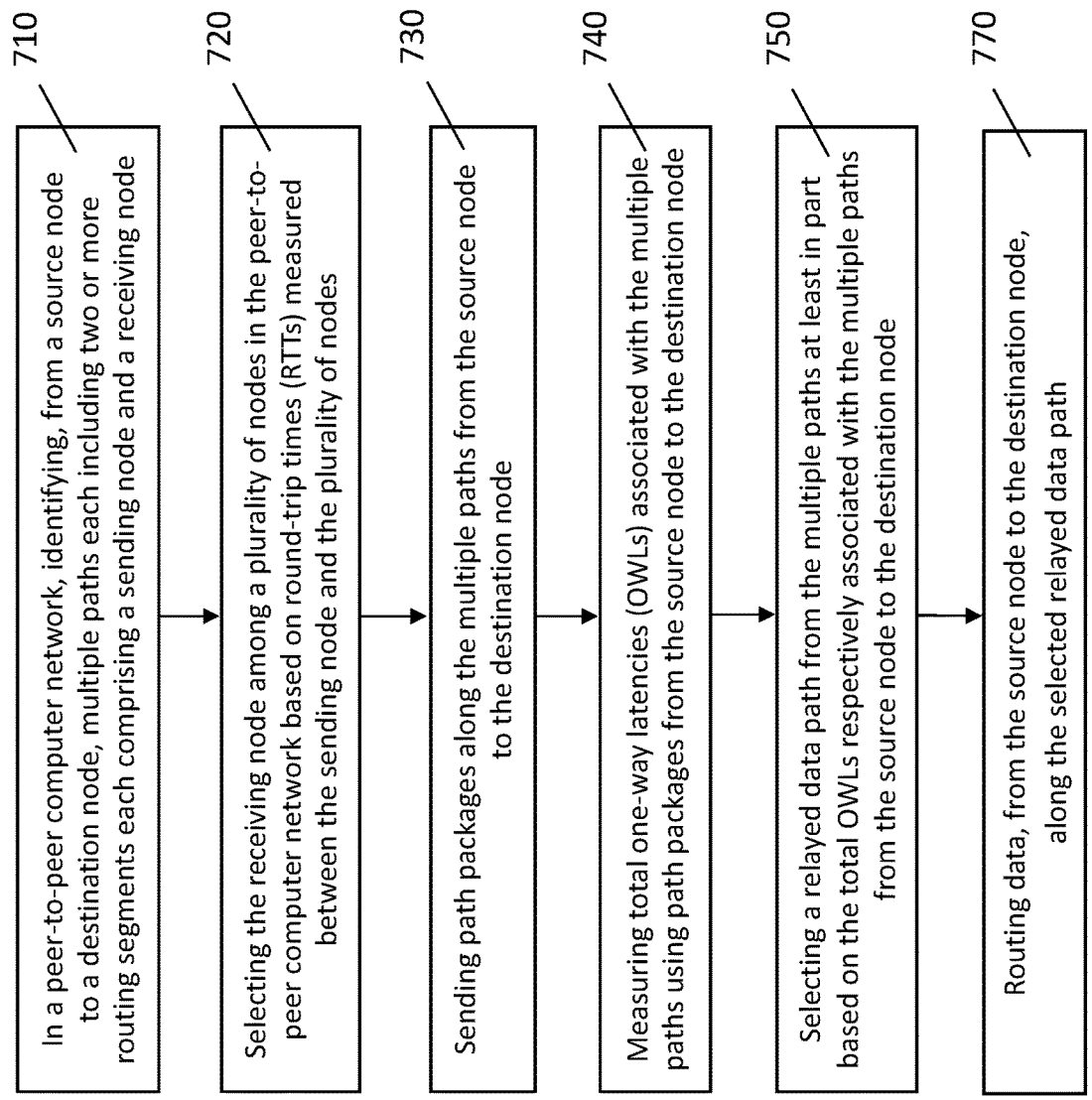
FIG. 7 is a flowchart for a hybrid decentralized data routing method in a peer-to-peer computer network in accordance with some embodiments of the present invention.

In some embodiments, referring to FIG. 7, a hybrid decentralized data routing method in a peer-to-peer computer network can include one or more of the following steps: when a need arises to route data from a source node to a destination node in a peer-to-peer computer network, multiple paths are identified from the source node to the destination node in the peer-to-peer computer network. Each of the multiple paths can include two or more routing segments that each includes a sending node and a receiving node (step 710).

In the presently disclosed method, the protocols for selecting paths in a peer-to-peer computer network (such as measurements and evaluations of latencies and other data transfer metrics, the encryption of the path packages) and for maintaining connections between peer nodes (such as measuring round-trip times between nodes, the selections and organization of neighbor nodes) are pre-installed in the peer nodes within the peer-to-peer computer network.

In identifying the multiple paths, the receiving node in one of the routing segments in one of the multiple paths is selected among a plurality of nodes in the peer-to-peer computer network based on round-trip times (RTTs) measured between the sending node and the plurality of nodes (step 720).

As described above in relation to FIGS. 4-6, each node in the peer-to-peer computer network, such as the sending node in one of the routing segment, can maintain a list of neighbor nodes. The neighbor nodes associated with the sending node in the routing segment are selected among a plurality of nodes based on the RTTs between the sending node and the plurality of nodes.

The RTT between the sending node and one of the plurality of nodes is measured using pulse messages sent between the sending node and one of the plurality of nodes. The RTT is calculated using a sending time stamp of a pulse message sent from the sending node and a reception time stamp of a return pulse message, received by the sending node, in response to the pulse message. Even if some computer clocks at the plurality of nodes in the peer-to-peer computer network can have skews relative to each other, the RTT calculations are independent of the skews between the computer clocks at the plurality of nodes in the peer-to-peer computer network.

As previously described (270 in FIG. 2, steps 420-470 in FIG. 4 and step 610 in FIG. 6), the neighbor nodes are sorted into a plurality of orbital bins according to RTTs between the sending node and the neighbor nodes (steps 460-470 in FIG. 4). Each of the orbital bins is associated a specific interval for the RTT values.

In identifying one of the multiple paths, the receiving node in one of the routing segments is selected from the neighbor nodes associated with the sending node in the same routing segment.

In some embodiments, peer-node hash tables (275 in FIG. 2) are stored in the peer-to-peer computer network. Each of the peer-node hash tables each includes hash values of node IDs of neighbor nodes associated with a potential sending node (275 in FIG. 2). The step of identifying multiple paths from a source node to a destination node can include querying the destination node using the peer-node hash tables stored at the source node and other potential sending nodes in the peer-to-peer computer network.

In some embodiments, the receiving node or the sending node (which can be a relay node) along a routing path can be a virtual node.

Path packages are sent along the multiple paths from the source node to the destination node (step 730). As described previously (280 in FIG. 2, step 540 in FIG. 5, step 620 in FIG. 6), the path packages are for quantitatively measuring and evaluating different routing path options from the source node to the destination node (steps 630-660 in FIG. 6). A path packet can include a sending time stamp recorded at the source node. At each receiving node, the path packet can be updated to include a reception time stamp recorded at the receiving node and an identification of the receiving node. Moreover, the one of the path packets can be updated to include a cryptographic signature at the receiving node. The cryptographic signature can be signed with a private key paired with a public key associated with the receiving node. In some embodiments, the public key of the receiving node can be obtained from a node identification (ID) of the receiving node.

Next, total one-way latencies (OWLs) associated with the multiple paths are measured using path packages from the source node to the destination node (step 740). The total OWL for one of the multiple paths is obtained by summing OWLs measured by one of the path packages along all routing segments in the one of the multiple paths (280 in FIG. 2, step 550 in FIG. 5, step 675 in FIG. 6). Even if some computer clocks at the plurality of nodes may have skews relative to each other, the total OWLs measured in the multiple paths are independent of the skews between the computer clocks at the plurality of nodes (i.e., the relay nodes along the multiple paths) in the peer-to-peer computer network because offsets in the reception time and the sending time of the path package at the relay nodes can cancel out each other.

A relayed data path can then be selected from the multiple paths at least in part based on the total OWLs respectively associated with the multiple paths from the source node to the destination node (step 750). As discussed previously (280 in FIG. 2, step 560 in FIG. 5, step 680 in FIG. 6), the selected relayed data path has a total OWL lower than at least one other path in the multiple paths. In most situations, a selected relayed data path has among the shortest total OWL among all evaluated paths from the source node to the destination node. In some embodiments, multiple relayed paths can be selected from the source node to the destination node, which can serve as alternative data routing paths for providing redundant routing pathways in case one of them fails for some reason.

The selection of relayed data path(s) can also include sending one or more path packages from the source node to the destination node in a direct data path from the source node to the destination node (steps 520-530 in FIG. 5). The total OWL of the relayed data path is compared to that of the direct data path. The relayed data path is selected when it provides a lower total OWL than the direct data path (280 in FIG. 2, step 560 in FIG. 5, step 680 in FIG. 6).

In some embodiments, jitters associated with the multiple paths are also measured using path packages from the source node to the destination node. The selection of the relayed data path from the multiple paths can further take into account of jitters associated with the multiple paths from the source node to the destination node (steps 625, 675 in FIG. 6). For example, a path is not selected if it is characterized with high data jitters even it has low total OWL.

In some embodiments, the relayed data path is selected from the multiple paths further based on the numbers of routing segments respectively associated with the multiple paths from the source node to the destination node. In general, fewer routing segments (i.e., fewer relay nodes) are preferred for a routing path because it represents a more reliable routing option with few relay nodes and thus few failure mechanisms. The selection of a relayed data path can be based on an optimization of a shorter total OWL and a smaller number of routing segments (or relay nodes). For example, two routing paths, path A and path B, have similar total OWLs, but path B has one relay node (i.e., two routing segments) while path A has two relay nodes (i.e., three routing segments), then path B is preferred and can be selected due to its fewer number of relay nodes.

Data can then be routed along the relayed data path selected from the source node to the destination node, (step 760) in the peer-to-peer computer network.

The above disclosed system and method provide a novel hybrid approach: nodes in a peer-to-peer network are qualified and maintained largely based on round-trip pulse measurements between peer nodes, while data routing paths are measured and selected based on one-way latency measurements. In other words, round-trip pulse measurements are used in peer node selection, and one-way latency measurements are used in routing path selection.

In some embodiments, a hybrid decentralized data routing method includes self-organizing and maintaining a peer-to-peer computer network (related to step 310 in FIG. 3). Neighbor nodes and candidate nodes of a node in a peer-to-peer computer network are measured, evaluated, selected, and maintained using pulse messages and return pulses (steps 430, 440 in FIG. 4). The measurement and evaluations can be based on round-trip times (RTTs), jitter of the return messages, reliability of the neighbor nodes or the candidate nodes, etc.

In some embodiments, the pulse messages sent from a node in the peer-to-peer computer network to the neighbor nodes and the candidate nodes (step 430 in FIG. 4) can be scheduled at a regular time interval such as at 1 second apart. Each of these pulse messages can contain a sending time, the node ID of the neighbor node or the candidate node that received the pulse message. The return pulse can include reception time of the pulse message and the node ID of the neighbor node or the candidate node that sent the return pulse.

In addition, pulse messages and return pulses can contain other information:
1) Estimated RTT, OWL, jitter, and clock skew between first node and second node; and
2) Estimated RTT, OWL, jitter, and clock skew between first node and other neighbor nodes. Such information about other neighbor nodes is shared with trusted nodes or when a second node just joined the computer network. Such neighbor node information can be shared randomly or periodically, e.g., every 60 s.

In some embodiments, the pulse messages sent from a node in the peer-to-peer computer network to the neighbor nodes and the candidate nodes (related to step 430 in FIG. 4, step 610 in FIG. 6, step 750 in FIG. 7 described above) can be customized based a few parameters:
1) Sparse measurements.
    The intervals between or the frequency of the pulse messages can be dynamically adjusted to result in sparse measurements of RTTs. The sparse measurements can reduce data traffic, or the overhead produced by the pulse messages and their associated return pulses on the computer network. The intervals between the pulse messages are aperiodic, which can for example follow a pattern 1s, 5s, 20s, 1s, 5s, 20s . . . or can be irregular or random values (within a predetermined range such as between [1s, 60s]). Such sparse measurements can properly evaluate and maintain stable links between a node in the peer-to-peer network with its neighbor nodes at a lower cost to the network.
2) Seasonality in pulse messages and RTT measurements.
    The intervals between or the frequency of the pulse messages can be based on time of the day, time of the week, time of the year, and event times such as holidays, sports events, new streaming releases, etc. More frequent pulse messages (i.e., having shorter intervals) can be conducted if critical communications are required: peak work time, and peak entertainment time (such as streaming for a sports event). High data traffic often create congestions in some routes, which create more opportunities for relaying data at shorter OWLs and low jitter.
3) Dependence on network location or network performance.
    Pulse messages can be sent and return pulses can be measured at higher frequency in network locations where Internet or the computer network are less stable. In these areas, neighbor nodes may be measured and updated more frequently to remove nodes that no longer perform.
4) Node role dependence.
    Pulse messages can also be sent to different types of nodes at different frequencies or average pulse intervals. The top relay nodes (those nodes that have been selected often to replay data) can be measured more frequently than other neighbor nodes in the orbital bins (described in relation to step 460 in FIG. 4) because the relay nodes are the ones most often used for relaying next data routing tasks and most mission critical. The neighbor nodes in orbital bins can also be measured more frequently by pulses messages than candidate nodes. Since it is not frequent for a candidate node to be updated to become a neighbor node, it is not necessary to measurement RTTs with candidate nodes too frequently. In one implementation, frequency or pulse intervals of the pulse messages can be based on several three tiers of the nodes' roles: a) relay nodes (nodes that have been relaying data for other peer nodes); b) neighbor nodes in the orbital bins (pre-selected neighbor nodes); c) candidate nodes (nodes that may potentially be selected as neighbor nodes).

In some embodiments, pulse message interval PMI can be a function of a few parameters as expressed in the formula below:

$$PMI = f(time, r, nr), \qquad (1)$$

wherein time is time of the day, time of the week, time of the year, and event times as described above. r is geographic location or the topological location of a node in the peer-to-peer network. r is characterized by a general network performance (e.g., stability or jitter, bandwidths, the amount traffic, down time, density of peer nodes with the peer network, historic relay statistics, etc.) at that locality. nr, or node role, is the role of recipient node for the pulse messages, which may include relay nodes, neighbor nodes selected in the orbital bins, and candidate nodes. These nodes can all receive pulse messages from a node in the peer-to-peer network but as described above, they do not need to be evaluated at the same intensity or frequency.

Figure 8:
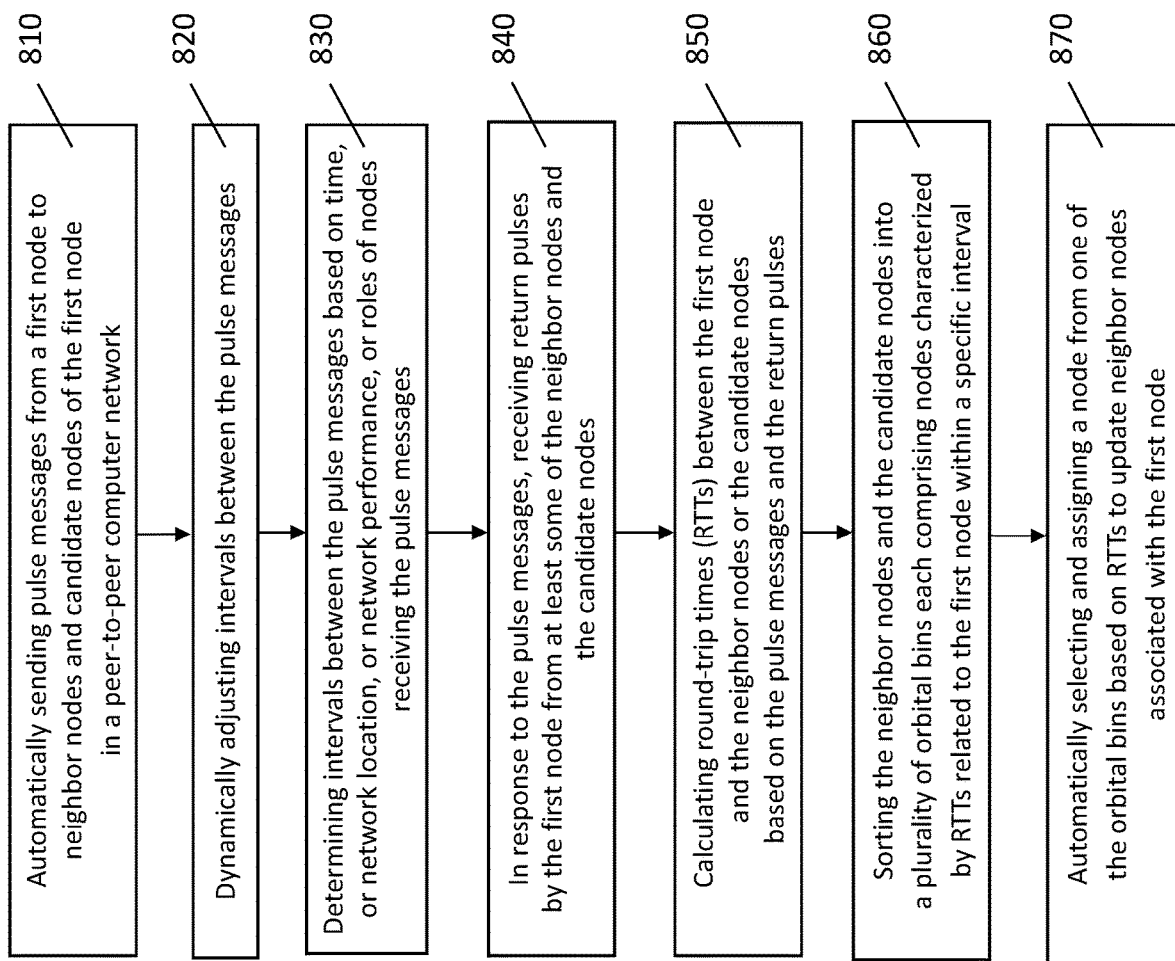
FIG. 8 is a flowchart for a hybrid decentralized data routing method using dynamically spaced pulse messages in a peer-to-peer computer network in accordance with some embodiments of the present invention.

In some embodiments, Referring to FIG. 8, a first node in a peer-to-peer computer network stores information about of its neighbor nodes in the peer-to-peer computer network. In the example shown in FIG. 1, node A stores information of its neighbor nodes, such as node B, node C, node V1, and node R that node A is connected to in the peer-to-peer computer network. The information can include node IDs and other properties (such as IP addresses, port numbers, and protocols) of the neighbor nodes, which as described above can be stored in a peer-node hash table (e.g., 275 in FIG. 2).

Optionally, the first node can also store information about candidate nodes that are currently not neighbor nodes of the first node but may be selected to become neighbor nodes to the first node in the future. The candidate nodes are nodes that the first node is aware of and has incrementally stored previously. In some embodiments, the candidate nodes can be shared by the neighbor nodes of the first node. For example, in FIG. 1, Node A's neighbor nodes, i.e., node B, node C, node V1, and node R are in communication with node A. Under DARP protocols, these node A's neighbor nodes can share with node A about the nodes they are respectively connected to and are aware of. For instance, the candidate nodes stored at node A can include nodes that are connected to node B, node C, node V1, and node R, such as node P and node V2 that are connected to node R. The candidate nodes allow node A to explore a larger pool of nodes and to expand its network of neighbor nodes in each update. At the same time, some of the nodes that node A has been connected may become unstable or non-responsive or non-performing (e.g., increased data latencies or increased data jitter), these nodes may be dropped off from node A's connections (i.e., Node A's list of neighbor nodes, with more details described below). The balance of expansion and trimming of neighbor nodes (i.e., updated connection with the first node) assures a healthy operational peer-to-peer computer network.

In general, nodes are self-managed and self-organized in the peer-to-peer computer network based on the performance by the data connections between the nodes. Thus, the nodes in the peer-to-peer computer network are required by DARP protocols to continually measurement performance characteristics (e.g., latency, jitter, etc.) of their connections. Based on the most updated performance measurements, the peer-to-peer computer network dynamically refresh its members: some good performing nodes are added to neighbor nodes, and some non-response or bad performing nodes are removed from neighbor nodes. The updated neighbor nodes for all nodes in the peer-to-peer computer network form the updated nodes for the peer-to-peer computer network. To this end, pulse messages are regularly automatically sent from the first node to the neighbor nodes and the candidate nodes (step 830). Each of the pulse messages is characterized by a sending time stamp at the first node.

In some embodiments, the time intervals between the pulse messages sent out from the first node can be kept at a regular interval such as 0.5 second, 1 second, or 2 seconds, etc. In some embodiments, the time intervals between the pulse messages can be dynamically adjusted (step 820). One motivation to increase the interval between pulse messages (or decreasing average frequency of the pulse messages) is to reduce the number of pulse messages and reduce the burden or overhead of DARP measurements on the computer network. In many situations, sparse pulse-message measurements can be made without sacrificing the need to evaluate and maintaining peer nodes in the peer-to-peer computer network.

The intervals between the pulse messages can be determined based on time (e.g., time of a day, or a week, or schedules of events such as holiday, sports games, etc.), or network location, or network performance, or roles of nodes receiving the pulse messages (step 830). The intervals between the pulse messages can be determined based on one, or a combination of two or more factors described above.

In response to the pulse messages, the first node receives return pulses from at least some of the nodes in the neighbor nodes and the candidate nodes (step 840). Each of the return pulses is characterized by a reception time stamp at the first node. Similarly, each of the pulse messages sent from the first node to one of the neighbor nodes or the candidate nodes is associated with a sending time stamp.

Next, round-trip times (RTTs) between the first node and its neighbor nodes or its candidate nodes are calculated based on the pulse messages and the return pulses (step 850). Each of the return messages is characterized by a reception time stamp. Since both sending and reception times are measured at the first node, thus RTT calculations are independent of the clocks at the neighbor nodes and the candidate nodes. A neighbor node or a candidate node receives a pulse message from the first node at a reception time and sends a return message back to the first node at a transmittance time. The reception time and transmittance time cancel out each other in the calculation of the RTT at the first node using the transmittance time of the pulse message at the first node and the reception time of the return message at the first node. However, RTT measurement may be affected by clock rate differences between the first node and the neighbor node or the candidate node. In some embodiments, the RTT calculations between the first node and neighbor nodes or the candidate nodes in step 850 can compensate the clock rate differences between different nodes. The first node can send pulse messages to a neighbor node or a candidate node at regular time intervals and receive return messages at regular time intervals. The return messages include transmittance times at the neighbor node or the candidate node. The clock rate of the neighbor node or the candidate node can be calculated using the transmittance times. In RTT calculations, the time gap between the reception time and the transmittance time at the neighbor node or the candidate node can be adjusted according to the difference between the clock rates at the first node and the neighbor or candidate node. In other words, the RTT measurements and calculations can be independent of the clock skews or clock rate discrepancies at the counterpart testing nodes. In the presently disclosed method, RTTs are used for monitoring connection performances between pairs of neighboring nodes in the peer-to-peer computer network.

The neighbor nodes and the candidate nodes are then sorted into a plurality of orbital bins each comprising nodes characterized by RTTs related to the first node within a specific interval (step 860). As noted above, each orbital bin is defined by a range of RTT such as [0 ms, 5 ms], [5 ms, 10 ms] . . . , etc. In one respect, nodes in different orbital bins can be considered being at different distances from the first node in relation to data transport. The spread in "data transport distances" between the orbital bins assures an optimal reach of the first node's connections with its neighbor nodes. The nodes that have not successfully updated with RTTs are not sorted in the orbital bins.

From each of the orbital bins, at least one node is automatically selected based on RTTs associated with the node. The selected node is added to updated neighbor nodes for the first node (step 870). The updated neighbor nodes of the first node can include nodes that were previously neighbor nodes or previously candidate nodes relative to the first node. In other words, some neighbor nodes are reaffirmed with their neighbor nodes status, and some candidate nodes are upgraded to become neighbor nodes in this update cycle. Those previous neighbor nodes that are not confirmed and removed from the list of neighbor nodes associated with first node. The updated neighbor nodes are characterized by their orbital bins and RTTs in relation to the first node, which are used in routing path finding as described in relation to FIGS. 5-7.

The sum of updated neighbor nodes of all the nodes in the peer-to-peer computer network form the updated nodes in the peer-to-peer computer network (step 870).

Within an orbital bin, a node having a shorter RTT can be selected, which gives a faster data transport within RTT range of that orbital bin. Moreover, the node selection within each orbital bin can also take into account of jitters, bandwidths, clock rate differences, and other performance parameters measured by the pulse messages and the return pulses at the first node. A node will not be selected if measured jitters, bandwidths, clock rate differences, and other performance parameters exceeding a respective threshold. It should be noted that the neighbor nodes and the candidate nodes that are non-responsive to the pulse messages from the first node do not lead to updated RTT calculations and are not sorted into the orbital bins. These non-response nodes are thus discarded if some of them were on members of the peer-to-peer computer network. Furthermore, those nodes that have recently measured jitter exceeding a predetermined threshold can also be removed from the list of updated nodes in the peer-to-peer computer network if they have been.

In some embodiments, when two nodes in the same orbital bin have similar performances (in latencies and jitter), the node that has been an updated node in the peer-to-peer computer network for longer duration is selected. This criterion is based on the observation that nodes that have shown longer period of reliable performance more likely provide more reliable performance in the future.

The process of automatically routing data from a first node to a second node in the peer-to-peer computer network have been disclosed in FIGS. 5-7 and related discussions described above. The selected routing path includes a neighbor node stored in one of the orbital bins associated with the first nod. For example, as illustrated in FIG. 1, node R in orbital bin 20 can relay data from node A to node Z.

One striking advantage of the disclosed method is in its vast scalability of the data routing method. Each node in the peer-to-peer network only needs to maintain a small number of neighbor nodes, which drastically reduces the burden of maintaining the peer network. Since all peer nodes in the network are connected in a cascading fashion, a node in the peer network can reach any other node in the same network. Thus, the decentralized data routing approach can perform data routing in a peer-to-peer network of hundreds of nodes as well as a billion nodes.

Another important aspect of the above disclosed system and method is in its network security. The data messages and data packages sent between peer nodes can be signed cryptographically by the relay nodes using their private keys similar to blockchain technologies. The signatures can be verified using node identifications related to public keys.

The above embodiments are only used to illustrate the technical solution of the present invention but not to limit it. Those skilled in the art can modify or equivalently replace the technical solution of the present invention without departing from the spirit and scope of the present invention. The scope of protection shall be subject to the claims.

What is claimed is:

1. A method for autonomously routing data in a peer-to-peer computer network, comprising:
   automatically updating the peer-to-peer computer network comprising a plurality of nodes, comprising:
   automatically sending pulse messages from a first node to neighbor nodes and candidate nodes associated with the first node;
   dynamically adjusting time intervals between the pulse messages;
   in response to the pulse messages, receiving return pulses by the first node from at least some of the neighbor nodes and the candidate nodes;
   calculating round-trip times (RTTs) between the first node and the neighbor nodes or the candidate nodes based on the pulse messages and the return pulses;
   sorting the neighbor nodes and the candidate nodes into a plurality of orbital bins each characterized by a specific interval of the RTTs associated with the first node; and
   based on the RTTs, automatically selecting and assigning a node from one of the orbital bins to update the neighbor nodes associated with the first node; and
   automatically relaying the data from the first node to a second node by one of the neighbor nodes associated with the first node.

2. The method of claim 1, wherein the time intervals between the pulse messages are dynamically adjusted based on time of a day, time of a week, or schedules of events.

3. The method of claim 1, wherein the time intervals between the pulse messages are dynamically adjusted based on a network location or network performance.

4. The method of claim 1, wherein the time intervals between the pulse messages are dynamically adjusted based on roles of the neighbor nodes or the candidate nodes receiving the pulse messages from the first node.

5. The method of claim 4, wherein the roles comprise the neighbor nodes, the candidate nodes, or relay nodes, which have relayed data in the peer-to-peer computer network.

6. The method of claim 1, wherein an RTT between the first node and one of the neighbor nodes or the candidate nodes is calculated by a sending time stamp of a pulse message sent from the first node and a reception time stamp of a return pulse received by the first node in response to the pulse message, the sending time stamp and the reception time stamp being both recorded at the first node.

7. The method of claim 6, wherein at least some of computer clocks at the plurality of nodes have skews or clock rate discrepancies relative to each other, wherein step of calculating RTTs is independent of the skews or the clock rate discrepancies between the computer clocks at the plurality of nodes in the peer-to-peer computer network.

8. The method of claim 1, wherein the neighbor nodes and the candidate nodes are sorted substantially evenly into a plurality of orbital bins based on the RTTs of the associated return messages received by the first node.

9. The method of claim 1, wherein step of automatically relaying the data from the first node to the second node by one of the neighbor nodes associated with the first node further comprises:
   sending one or more path packets from the first node directly to the second node to measure a one-way latency (OWL) and jitter in a direct path between the first node and the second node;
   sending one or more path packets from the first node to the second node via one or more relay nodes, each path packet recording a reception time stamp and a sending time stamps at the relay nodes along associated relayed data path;
   automatically selecting one of the relayed data paths if a total OWL and an average jitter associated with the one of the relayed data paths satisfy predetermine criteria in comparison to the direct path; and sending the data from the first node to the second node along the selected one of the relayed data paths.

10. The method of claim 9, further comprising:
cryptographically signing one of the path packets by a relay node in a relayed data path using a private key paired with a public key of the relay node.

11. The method of claim 9, further comprising:
cryptographically signing an updated version of one of the path packets by a relay node in a relayed data path, wherein the updated version of the path packet includes node IDs of a previous node and a next node along the relayed path and a measured OWL of a last routing segment along the relayed path.

12. The method of claim 9, further comprising:
storing, at each of the updated nodes, a peer-node hash table that includes hash values of the node IDs of some of the updated nodes; and querying a node ID of the second node using peer-node hash tables stored at the first node and other updated nodes.

13. The method of claim 9, wherein the total OWL associated with each of the one or more relayed data paths between the first node and the second node is obtained by summing OWLs measured at all routing segments along the each of the one or more relayed data paths.

14. The method of claim 9, wherein the total OWL associated with a selected one of the relayed data paths is smaller than the OWL measured in the direct path from the first node to the second node.

15. The method of claim 9, wherein the average jitter associated with each of the one or more relayed data paths between the first node and the second node is obtained by calculating a mean of jitters measured at all routing segments along the each of the one or more relayed data paths.

16. A non-transitory computer-readable medium storing a plurality of instructions which, when executed by one or more processors, cause the one or more processors to perform operations in a peer-to-peer computer network, the operations comprising:
automatically updating the peer-to-peer computer network comprising a plurality of nodes, comprising:
automatically sending pulse messages from a first node to neighbor nodes and candidate nodes associated with the first node;
dynamically adjusting time intervals between the pulse messages;
in response to the pulse messages, receiving return pulses by the first node from at least some of the neighbor nodes and the candidate nodes;
calculating round-trip times (RTTs) between the first node and the neighbor nodes or the candidate nodes based on the pulse messages and the return pulses;
sorting the neighbor nodes and the candidate nodes into a plurality of orbital bins each characterized by a specific interval of the RTTs associated with the first node; and
based on the RTTs, automatically selecting and assigning a node from one of the orbital bins to update the neighbor nodes associated with the first node; and automatically relaying data from the first node to a second node by one of the neighbor nodes associated with the first node.

17. The non-transitory computer-readable medium of claim 16, wherein the time intervals between the pulse messages are dynamically adjusted based on time of a day, time of a week, or schedules of events, or a network location or network performance.

18. The non-transitory computer-readable medium of claim 16, wherein the time intervals between the pulse messages are dynamically adjusted based on roles of the neighbor nodes or the candidate nodes receiving the pulse messages from the first node, wherein the roles comprise the neighbor nodes, the candidate nodes, or relay nodes that have relayed data in the peer-to-peer computer network.

19. A computer system for autonomously routing data in a peer-to-peer computer network, comprising:
a communication module configured to send or receive data to and from nodes in the peer-to-peer computer network comprising a plurality of nodes; and
a computer memory storing instructions that, when executed by one or more processors at the plurality of nodes, cause the plurality of nodes to:
automatically update the peer-to-peer computer network, comprising:
automatically send pulse messages from a first node to neighbor nodes and candidate nodes associated with the first node;
dynamically adjust time intervals between the pulse messages;
in response to the pulse messages, receiving return pulses by the first node from at least some of the neighbor nodes and the candidate nodes;
calculate round-trip times (RTTs) between the first node and the neighbor nodes or the candidate nodes based on the pulse messages and the return pulses;
sort the neighbor nodes and the candidate nodes into a plurality of orbital bins each characterized by a specific interval of the RTTs associated with the first node; and
based on the RTTs, automatically select and assigning a node from one of the orbital bins to update the neighbor nodes associated with the first node; and
automatically relaying the data from the first node to a second node by one of the neighbor nodes associated with the first node.

20. The computer system of claim 19, wherein the time intervals between the pulse messages are dynamically adjusted based on time of a day, time of a week, or schedules of events, or a network location or network performance.

21. The computer system of claim 19, wherein the time intervals between the pulse messages are dynamically adjusted based on roles of the neighbor nodes or the candidate nodes receiving the pulse messages from the first node, wherein the roles comprise the neighbor nodes, the candidate nodes, or relay nodes that have relayed data in the peer-to-peer computer network.

* * * * *